(12) United States Patent
Penning et al.

(10) Patent No.: US 11,285,616 B2
(45) Date of Patent: Mar. 29, 2022

(54) ROBOTIC COATING APPLICATION SYSTEM AND METHOD

(71) Applicant: Teradyne, Inc., North Reading, MA (US)

(72) Inventors: Ryan S. Penning, Madison, WI (US); Ralph F. Polimeni, Jr., Reno, NV (US); Brett L. Limone, Danvers, MA (US); James D. English, Alva, FL (US)

(73) Assignee: Teradyne, Inc., North Reading, MA (US)

( * ) Notice: Subject to any disclaimer, the term of this patent is extended or adjusted under 35 U.S.C. 154(b) by 11 days.

(21) Appl. No.: 16/127,960

(22) Filed: Sep. 11, 2018

(65) Prior Publication Data
US 2020/0078954 A1 Mar. 12, 2020

(51) Int. Cl.
*B25J 11/00* (2006.01)
*B05B 13/04* (2006.01)
(Continued)

(52) U.S. Cl.
CPC ....... *B25J 11/0075* (2013.01); *B05B 13/0431* (2013.01); *B05C 5/0212* (2013.01); *B05C 5/0216* (2013.01); *B05C 9/10* (2013.01); *B05C 13/02* (2013.01); *B05C 15/00* (2013.01); *B25J 9/0081* (2013.01); *B25J 9/163* (2013.01); *B25J 13/06* (2013.01); *B25J 13/081* (2013.01); *B25J 15/0066* (2013.01); *B25J 19/022* (2013.01); *B25J 19/023* (2013.01); *G05B 19/042* (2013.01)

(58) Field of Classification Search
None
See application file for complete search history.

(56) References Cited

U.S. PATENT DOCUMENTS 5,521,477 A * 5/1996 Sasaki ............... B05B 12/00 318/568.18
5,645,884 A * 7/1997 Harlow, Jr. ......... B05B 7/0815 427/424

(Continued)

FOREIGN PATENT DOCUMENTS

DE 102012212469 A1 * 1/2014 ............ B25J 9/18

OTHER PUBLICATIONS

International Search Report and Written Opinion issued in International Application No. PCT/US2019/050195 dated Feb. 28, 2020.

*Primary Examiner* — Jethro M. Pence
(74) *Attorney, Agent, or Firm* — Mark H. Whittenberger, Esq.; Holland and Knight LLP

(57) ABSTRACT

The specification and drawings present a robotic coating application system and a method for coating at least one part with a robotic coating application system. The robotic coating application system may comprise an enclosure configured to receive at least one part. The robotic coating application system may further comprise at least one robot configured to operate at least partially within the enclosure. The robotic coating application system may also comprise a graphical user interface to display a model of the at least one part and allow a user to select a portion or subportion of the model for application of a coating. The coating may be automatically applied to the at least one part based upon, at least in part, the user-selected portion or subportion.

9 Claims, 26 Drawing Sheets

(51) Int. Cl.
*B25J 13/08* (2006.01)
*B25J 19/02* (2006.01)
*B25J 9/16* (2006.01)
*B05C 5/02* (2006.01)
*B05C 9/10* (2006.01)
*B05C 13/02* (2006.01)
*B05C 15/00* (2006.01)
*B25J 13/06* (2006.01)
*B25J 9/00* (2006.01)
*B25J 15/00* (2006.01)
*G05B 19/042* (2006.01)

(56) References Cited

U.S. PATENT DOCUMENTS

2007/0281074 A1* 12/2007 Wang ............... B05B 12/00
427/8
2010/0304009 A1* 12/2010 Bausen ............ B05B 13/0431
427/8
2015/0081073 A1* 3/2015 Trautman .......... B05B 13/0457
700/98

* cited by examiner

ROBOTIC COATING APPLICATION SYSTEM AND METHOD

The invention was supported by Air Force SBIR contract: FA8100-18-C-0003. The U.S. Government has certain rights in the invention.

TECHNICAL FIELD

The invention generally relates to robotics and more specifically to generating a robotic coating application system.

BACKGROUND

Historically, masking or applying a coating to a part or product has been a manual effort requiring a dedicated work cell. Masking of small parts often requires significant labor resources, often consuming more time than the process it is done to prepare for. Masking requires training and skill, and positions are often hard to fill. For example, there is excess demand for qualified individuals to do masking and plating work. The shortage leads to understaffing, which limits part throughput. Even when labor is available, it is expensive, as labor is the dominant component of masking or plating work.

As will be discussed in greater detail below, embodiments of the present disclosure may allow customers to significantly reduce touch time for each part when compared to conventional masking processes, while maintaining precision and quality.

SUMMARY OF DISCLOSURE

In one implementation, a robotic coating application system may comprise at least one robot configured to apply a coating to at least one part. The robotic coating application system may also comprise a graphical user interface to display a model of the at least one part and allow a user to select a portion or subportion of the model for application of a coating. The coating may be automatically applied to the at least one part based upon, at least in part, the user-selected portion or subportion.

One or more of the following features may be included. A scanner may be configured to scan the part. At least one processor may be configured to generate the model of the part. The at least one robot includes at least one of a turntable and a robotic arm configured to hold the scanner. The robotic arm may include an end effector configured to perform scanning or applying of the coating. The scanner may be detachably affixed to the enclosure. A computing device may be configured to retrieve a model of the at least one part. The coating may be selected from the group consisting of maskant, adhesive, and paint. The graphical user interface may be configured to allow for user selection using a handheld device or touchscreen. While in a training mode, the at least one robot may be used to select a portion or subportion of the model for application of the coating. The robotic coating application system may comprise an enclosure configured to receive the at least one part. The at least one robot may be configured to operate at least partially within the enclosure. The enclosure or end effector may include ultraviolet light curing capabilities.

In another implementation, a computer-implemented method for coating at least one part with a robotic coating application system may include receiving at least one part in the robotic coating application system. A model of the at least one part may be displayed via a graphical user interface. A selection of a portion or subportion of the model for application of a coating may be received. The coating may be automatically applied to the at least one part based upon, at least in part, the user-selected portion or subportion, wherein the coating is applied via at least one robot.

One or more of the following features may be included. A scanner may be configured to scan the part. At least one processor may be configured to generate the model of the part. The at least one robot includes at least one of a turntable and a robotic arm configured to hold the scanner. The robotic arm may include an end effector configured to perform scanning or applying of the coating. The scanner may be detachably affixed to the enclosure. A computing device may be configured to retrieve a model of the at least one part. The coating may be selected from the group consisting of maskant, adhesive, and paint. The graphical user interface may be configured to allow for user selection using a handheld device or touchscreen. While in a training mode, the at least one robot may be used to select a portion or subportion of the model for application of the coating. The part may be received within an enclosure of the robotic coating application system. The at least one robot may be configured to operate at least partially within the enclosure. The enclosure or end effector may include ultraviolet light curing capabilities.

The details of one or more implementations are set forth in the accompanying drawings and the description below. Other features and advantages will become apparent from the description, the drawings, and the claims.

BRIEF DESCRIPTION OF THE DRAWINGS

For a better understanding of the nature and objects of the present invention, reference is made to the following detailed description taken in conjunction with the following drawings, in which.

DETAILED DESCRIPTION

Figure 1:
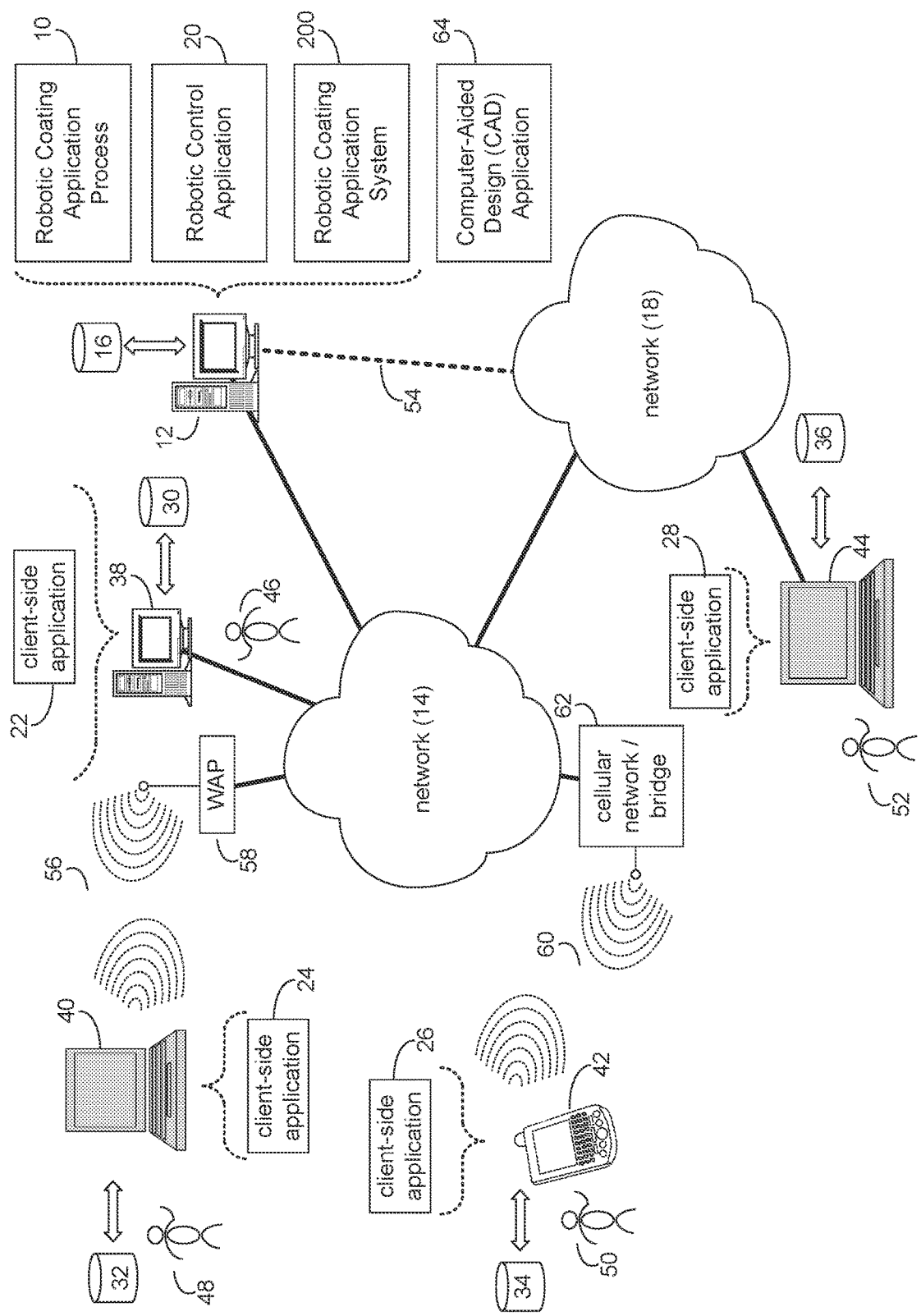
FIG. 1 is a diagrammatic view of a robotic coating application process coupled to a distributed computing network.

Referring now to FIG. 1, there is shown robotic coating application process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a robotic coating application system may comprise an enclosure configured to receive at least one part. The robotic coating application system may further comprise at least one robot configured to operate at least partially within the enclosure. The robotic coating application system may also comprise a graphical user interface to display a model of the at least one part and allow a user to select a portion or subportion of the model for application of a coating. The coating may be automatically applied to the at least one part based upon, at least in part, the user-selected portion or subportion.

The instruction sets and subroutines of robotic coating application process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Robotic coating application process 10 may be a stand-alone application that interfaces with an applet/application that is accessed via client applications 22, 24, 26, 28, 66. In some embodiments, robotic coating application process 10 may be, in whole or in part, distributed in a cloud computing topology. In this way, computing device 12 and storage device 16 may refer to multiple devices, which may also be distributed throughout network 14 and/or network 18.

Computing device 12 may execute a robotic control application (e.g., robotic control application 20), examples of which may include, but are not limited to, Actin® Software Development Kit from Energid Technologies of Cambridge, Mass. Robotic coating application process 10 and/or robotic inspection application 20 may be accessed via client applications 22, 24, 26, 28, 68. Robotic coating application process 10 may be a stand-alone application, or may be an applet/application/script/extension that may interact with and/or be executed within robotic inspection application 20, a component of robotic inspection application 20, and/or one or more of client applications 22, 24, 26, 28, 68. Robotic inspection application 20 may be a stand-alone application, or may be an applet/application/script/extension that may interact with and/or be executed within robotic coating application process 10, a component of robotic coating application process 10, and/or one or more of client applications 22, 24, 26, 28, 68. One or more of client applications 22, 24, 26, 28, 68 may be a stand-alone application, or may be an applet/application/script/extension that may interact with and/or be executed within and/or be a component of robotic coating application process 10 and/or robotic inspection application 20. Examples of client applications 22, 24, 26, 28, 68 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, 68 which may be stored on storage devices 30, 32, 34, 36, coupled to client electronic devices 38, 40, 42, 44 may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28 may be configured to effectuate some or all of the functionality of robotic coating application process 10 (and vice versa). Accordingly, robotic coating application process 10 may be a purely server-side application, a purely client-side application, or a hybrid server-side/client-side application that is cooperatively executed by one or more of client applications 22, 24, 26, 28 and/or robotic coating application process 10.

One or more of client applications 22, 24, 26, 28 may be configured to effectuate some or all of the functionality of robotic inspection application 20 (and vice versa). Accordingly, robotic inspection application 20 may be a purely server-side application, a purely client-side application, or a hybrid server-side/client-side application that is cooperatively executed by one or more of client applications 22, 24, 26, 28 and/or robotic inspection application 20. As one or more of client applications 22, 24, 26, 28 robotic coating application process 10, and robotic inspection application 20, taken singly or in any combination, may effectuate some or all of the same functionality, any description of effectuating such functionality via one or more of client applications 22, 24, 26, 28 robotic coating application process 10, robotic inspection application 20, or combination thereof, and any described interaction(s) between one or more of client applications 22, 24, 26, 28 robotic coating application process 10, robotic inspection application 20, or combination thereof to effectuate such functionality, should be taken as an example only and not to limit the scope of the disclosure.

Users 46, 48, 50, 52 may access computing device 12 and robotic coating application process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Robotic coating application process 10 may include one or more user interfaces, such as browsers and textual or graphical user interfaces, through which users 46, 48, 50, 52 may access robotic coating application process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

As discussed above and referring also at least to FIGS. 2-26, a robotic coating application system may comprise an enclosure configured to receive at least one part. The robotic coating application system may further comprise at least one robot configured to operate at least partially within the enclosure. The robotic coating application system may also comprise a graphical user interface to display a model of the at least one part and allow a user to select a portion or subportion of the model for application of a coating. The coating may be automatically applied to the at least one part based upon, at least in part, the user-selected portion or subportion.

Figure 2:
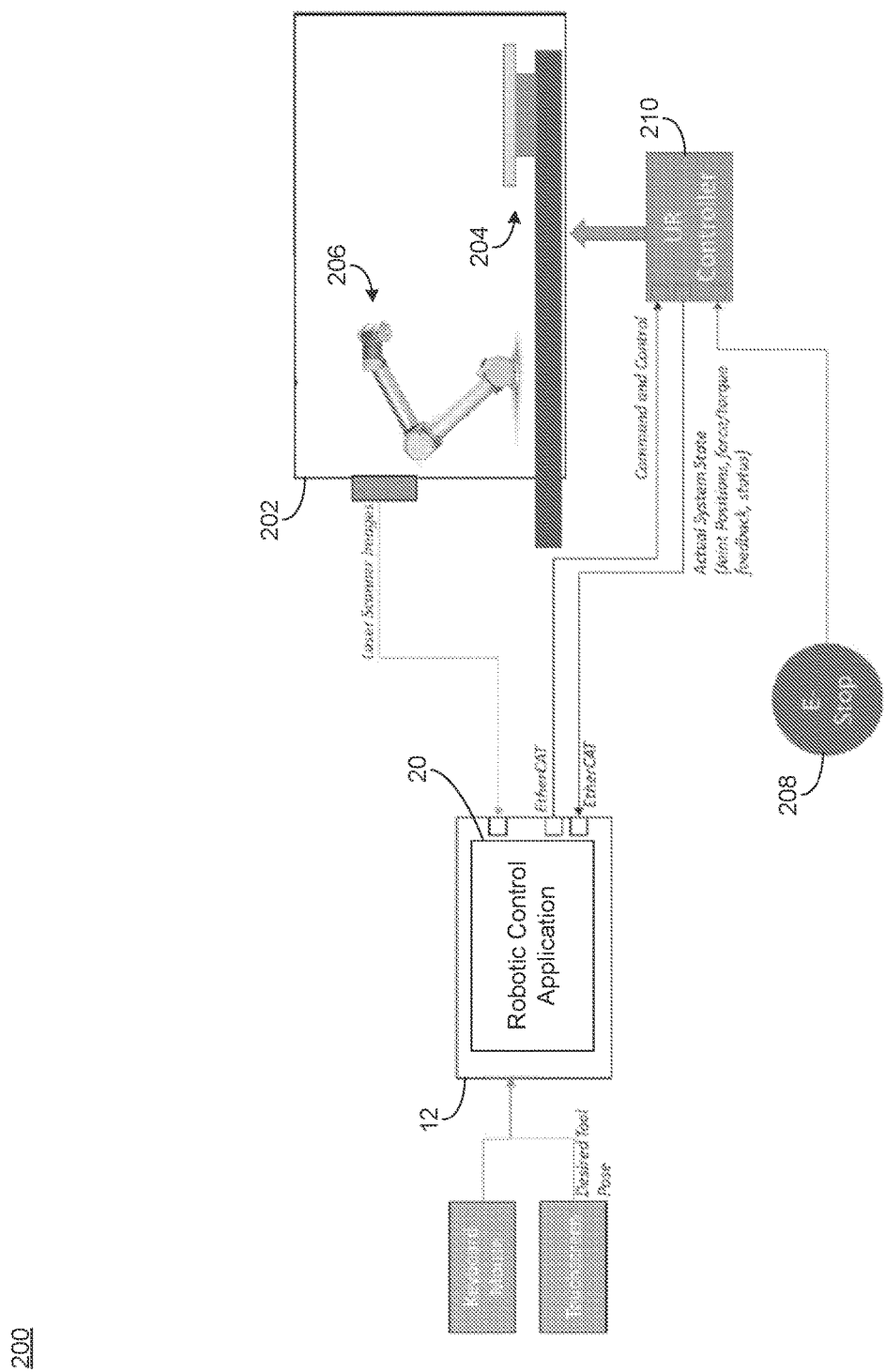
FIGS. 2-8 are diagrammatic views of robot coating application systems according to one or more implementations of the present disclosure.

Referring also to FIG. 2 and in some implementations, robotic coating application system (e.g., robotic coating application system 200) may interact with a computing device (e.g., computing device 12) and various robotic control applications (e.g., robotic control application 20) to apply a coating or maskant to various parts. As discussed above, embodiments of robotic coating application system 200 may overcome challenges associated with masking in preparation for plating work.

Plating is generally the process of applying a surface covering over a part using electrical or chemical techniques. It is used extensively in aerospace applications where extreme durability under intense conditions is required. However, plating can be used in various applications and industries beyond the aerospace industry and/or aerospace applications. Plating may generally offer a method through which the surface of a part can have different properties from the base material. The base material is usually determined by the manufacturing process, while the surface dictates usability aspects like contact resistance, corrosion resistance, electrical conductivity, thermal conductivity, and appearance.

A critical component of any plating process is masking. Before the application of the plating material, maskant—a self-sacrificing protective barrier—is applied to the areas on the part that should not be plated. This might be done to apply different plating materials to different components of a part; to avoid plating material buildup on threads, holes, and other features; or to conserve costly plating materials. It is especially important for the complex parts used in various industries, like the aerospace industry. After the plating process is complete, maskants are removed by mechanical processes (such as peeling), chemical processes, or thermal processes. While masking has been described, it will be appreciated that any coating may be applied to a part via a robotic coating application system. For example and in some implementations, the coating may be selected from the group consisting of maskant, adhesive, and paint.

Plating, plasma spraying, and other coating techniques require masking, covering the surfaces that are not to be treated. Masking is difficult for complex parts. It can take days and risk damage to the part, and human talent for masking is hard to find and keep. To address this difficulty, robotics offers a solution that is efficient, safe, and reliable. A robotic solution (e.g., utilizing embodiments of robotic coating application system 200) to the masking problem will relieve staffing restrictions, increase throughput, and lower the cost of plating for various industries.

In some implementations, the robotic coating application system may comprise an enclosure configured to receive at least one part. Referring also to FIGS. 2-6 and in some implementations, robotic coating application system (e.g., robotic coating application system 200) may comprise an enclosure (e.g., enclosure 202) configured to receive at least one part. In some implementations, the enclosure (e.g., enclosure 202) may support all types of parts. While the enclosure may be any size, example width and length dimensions may be approximately 4' by 4' with an additional approximately 2' by 2.5' area in one corner for part loading, unloading, and scanning when necessary. In some implementations, a second approximately 2' by 2.5' area may be located opposite the first 2' by 2.5' area. This may allow the unloading and reloading of one part while another is being sprayed. While example dimensions have been provided, it will be appreciated that the enclosure is not limited to any particular dimensions within the scope of the present disclosure. In some implementations, the robotic coating application system may include an area (e.g., without an enclosure) for applying a coating to the at least one part.

In some implementations, the enclosure may include a lighting system. The lighting system may include overhead lighting and may be of adequate lumens for the work space. In some implementations, the lighting system may be of a color spectrum that will not interfere with a maskant curing process. It will be appreciated that various lighting systems in various positions may be used within the enclosure within the scope of the present disclosure. As will be discussed in greater detail below, robotic coating application system may utilize ultraviolet (UV) light or electromagnetic radiation while coating a part. In some implementations, the enclosure may include ultraviolet light curing capabilities and may contain or prevent UV light from escaping the enclosure. For example, the enclosure may include a viewport configured to block UV light. In some implementations, the enclosure may provide ventilation with high efficiency particulate air (HEPA) filtration that allows venting indoors. However, it will be appreciated that any air filtration system may be utilized within the scope of the present disclosure.

Figure 3:
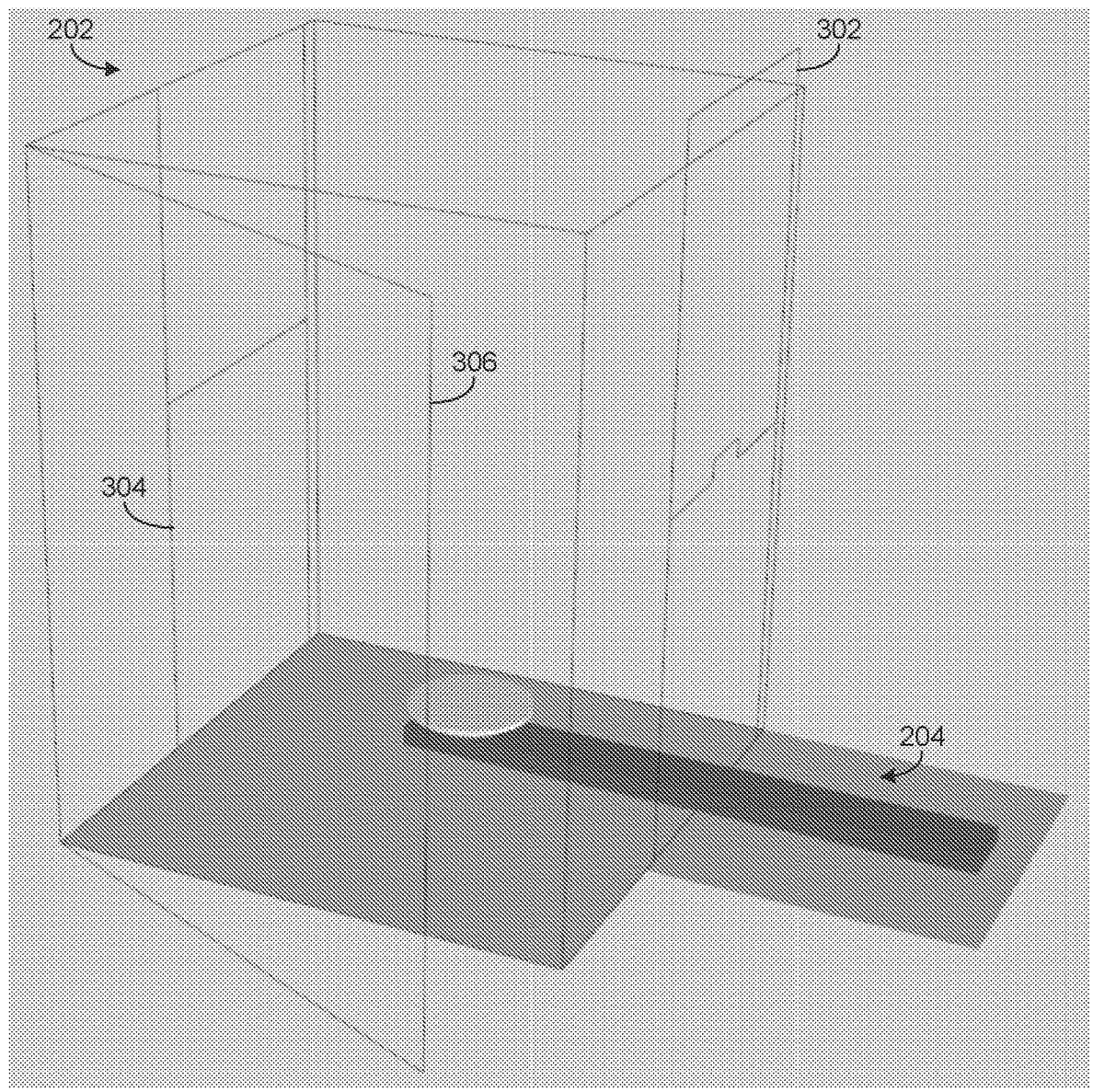
Figure 4:
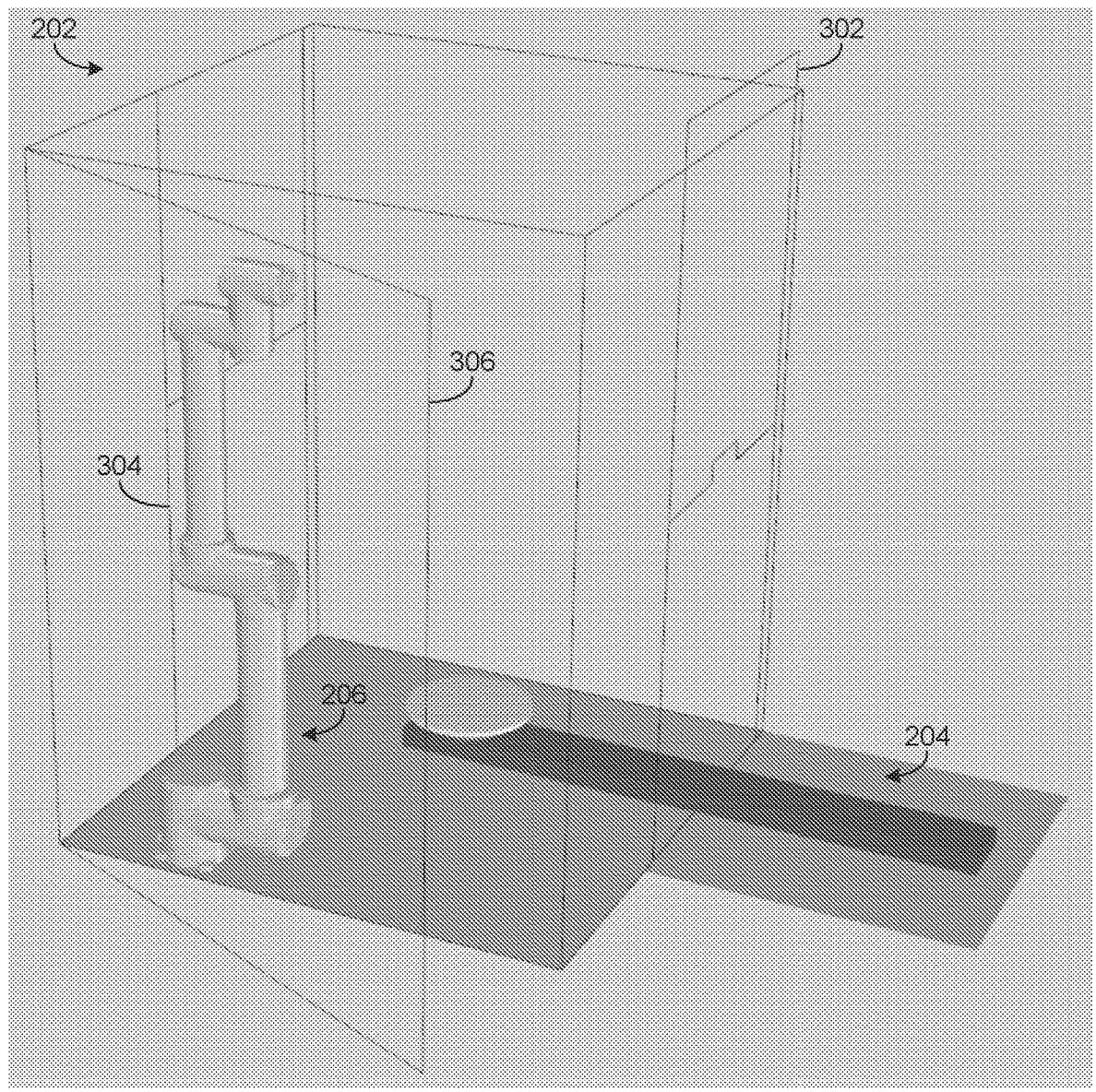
Figure 5:
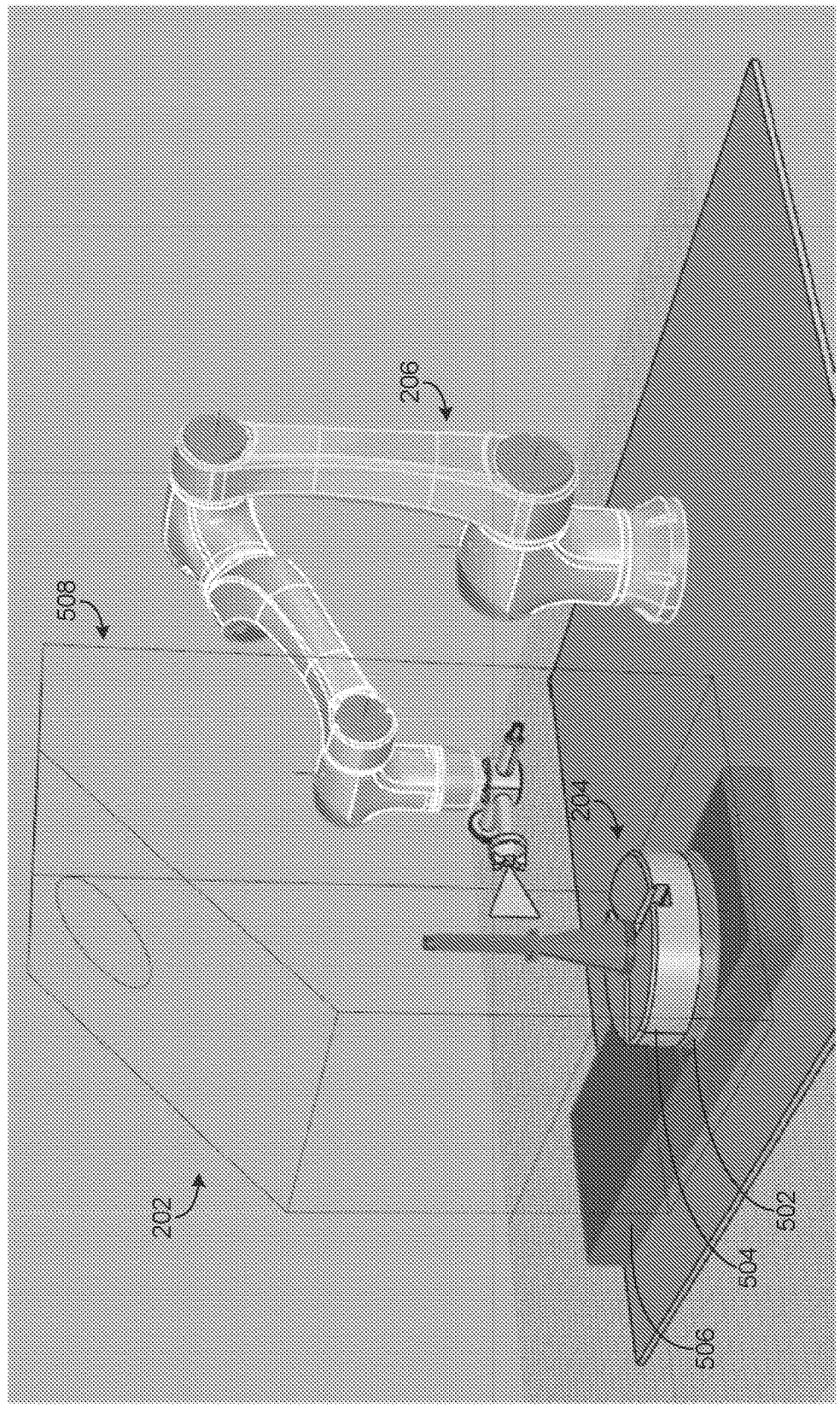
Figure 6:
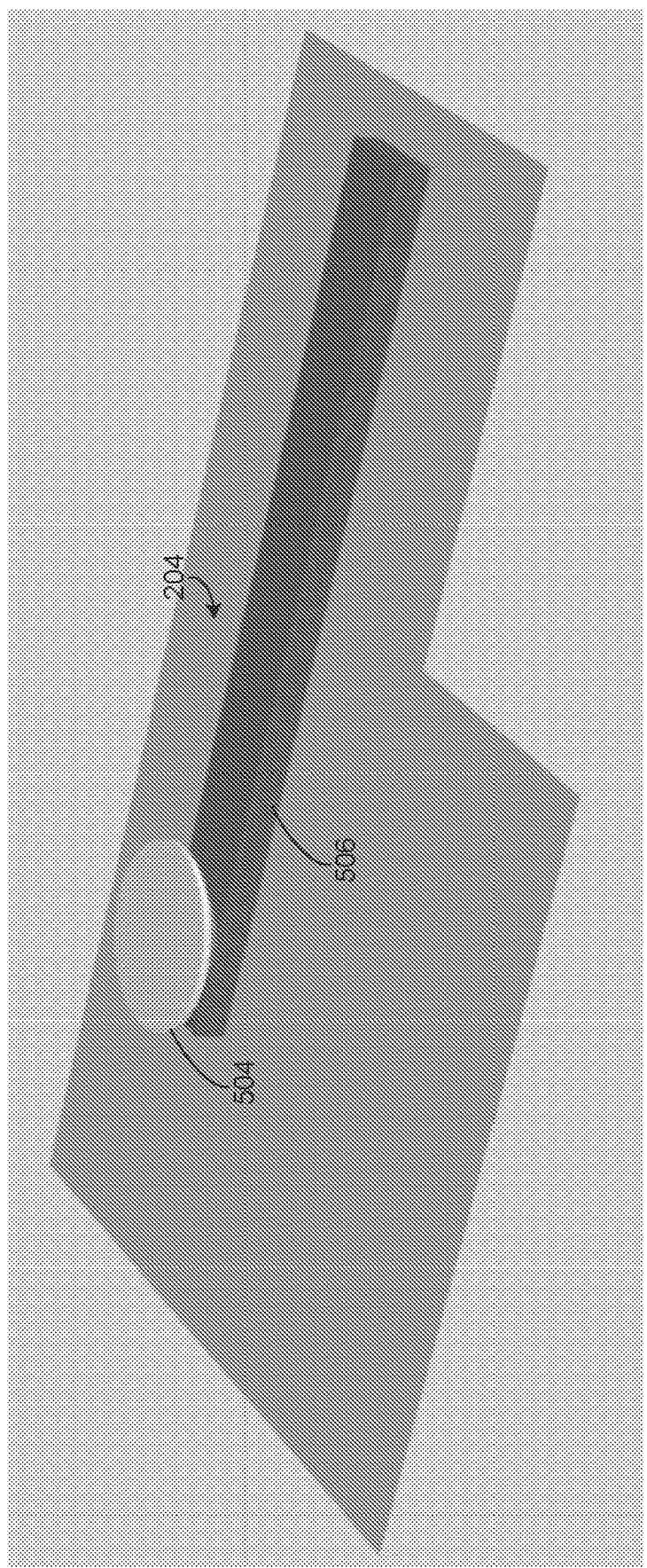
Figure 7:
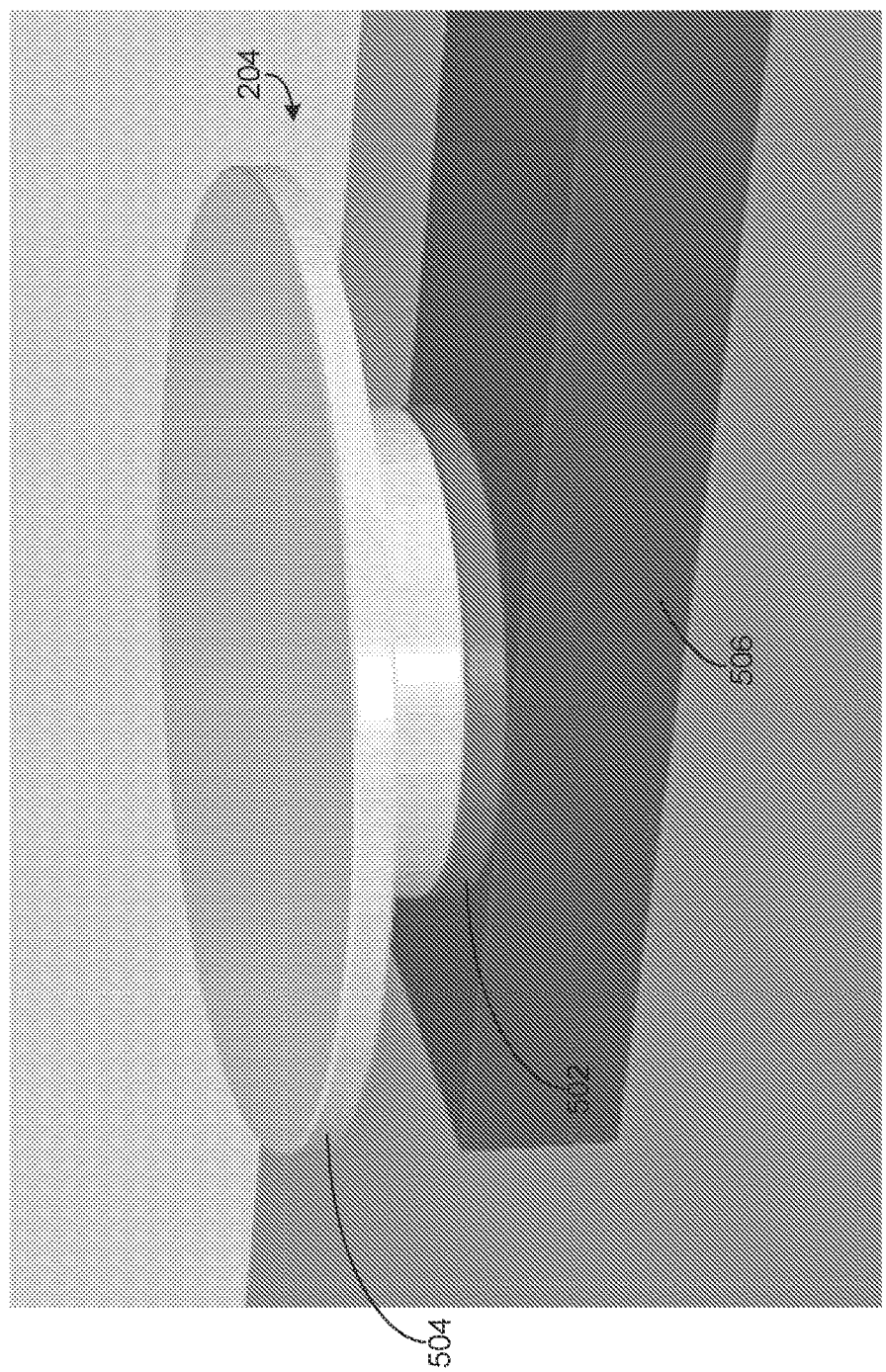
Figure 8:
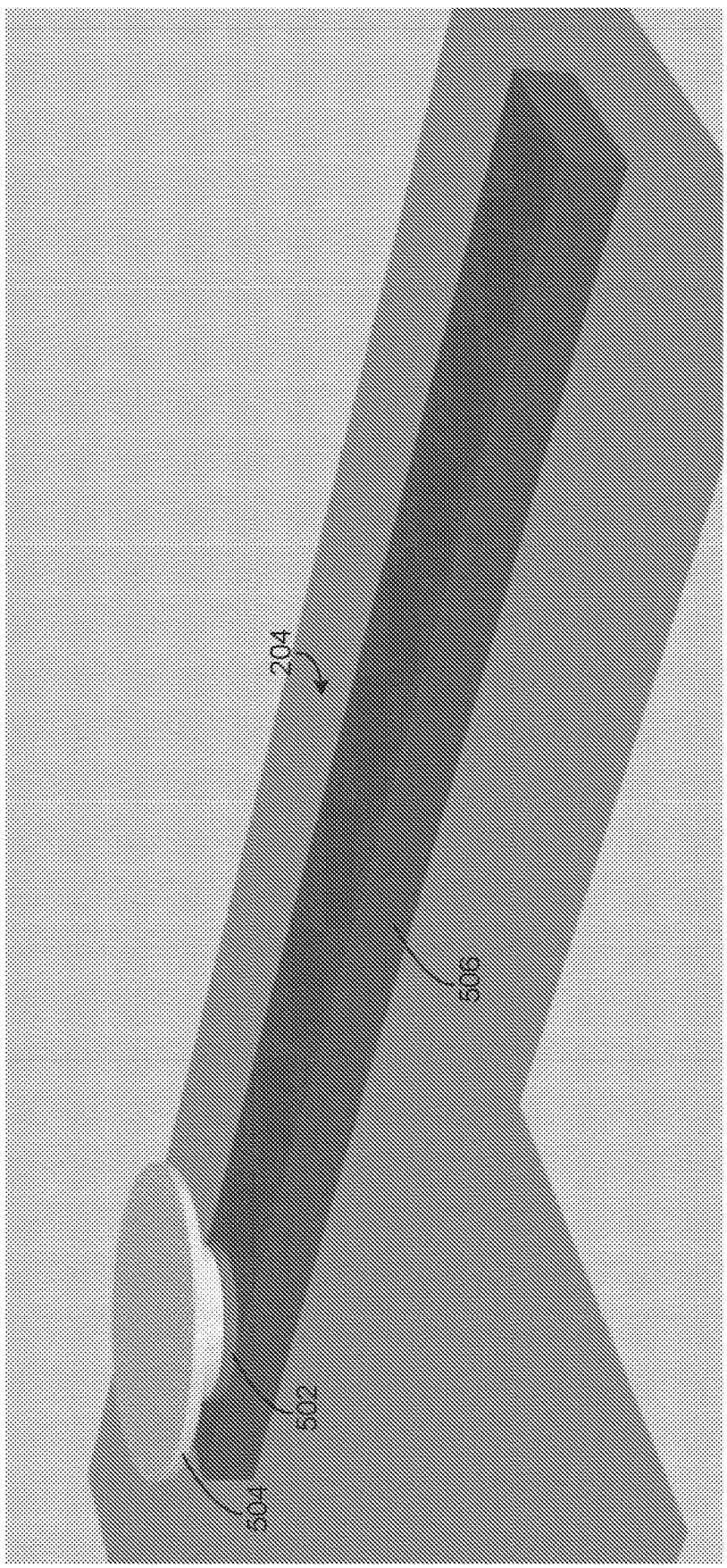

Referring also to FIG. 3, the enclosure may have at least one vertically mounted sliding door for part loading. For example, a first sliding door (e.g., access door 302) may be configured to open to receive at least one part into the enclosure. Upon receiving the part within the enclosure, the sliding door (e.g., access door 302) may be closed. In some implementations, the sliding door may be manually operated and/or automatically operated. In some implementations, a second sliding door (e.g., access door 304) may be configured to open following the coating of the part and may allow removal of the part from the enclosure. As with the first sliding door, the second sliding door may be manually operated and/or automatically operated. While sliding doors have been described, it will be appreciated that hinged doors and/or horizontally opening doors are possible and within the scope of the present disclosure. In some implementations, the enclosure may include an access door (e.g., access door 306) configured to open for entire enclosure access. In some implementations, the access door may be opened for accessing the at least one robot, cleaning the enclosure, inserting and removing parts, etc. In some implementations, the sliding door(s) may allow part loading and/or unloading and the access door may be provided for system maintenance and cleaning.

In some implementations, the robotic coating application system may comprise at least one robot configured to operate at least partially within the enclosure. In some implementations and as will be discussed in greater detail below, the at least one robot (e.g., robots 204, 206) may be configured to articulate components to help position the part to be coated and may coat the part. In some implementations, multiple robots may be used. For example, one robot may place masking material and a second robot may position the parts to be masked. While two robots have been discussed, it will be appreciated that any number of robots may be used within the scope of the present disclosure. As will be discussed in greater detail below and in some implementations, the at least one robot may include at least one of a turntable and a robotic arm.

As discussed above and in some implementations, the at least one robot may include a turntable. Referring also to FIGS. 3-8 and in some implementations, the at least one robot may include an actuated rotary table or actuated turntable (e.g., turntable 502) and/or a mounted plater (e.g., plater 504). In some implementations, the plater (e.g., plater 504) may be customized and may be easily replaceable for specific job/part requirements. The rotary axis of the turntable may provide 360° access to the parts. In some implementations, the turntable (e.g., turntable 502) may be configured to move along a track or rail. For example, and referring also to FIG. 6, a rail (e.g., rail 504) may be used to move the turntable (e.g., turntable 502) and plater (e.g., plater 504) in and/or out of the enclosure. In some implementations, the rail (e.g., rail 506) may extend from outside of the enclosure and through an access door (e.g., access door 302). In some implementations, the rail (e.g., rail 506) may be used to move the turntable (e.g., turntable 502) and plater (e.g., plater 504) in and out of the enclosure workspace, without requiring entry of personnel into a confined space. For example, the part(s) may be loaded and unloaded at a suitable location outside of the enclosure, then shuttled inside the enclosure for the maskant application and curing processes. Once completed the part may be returned via the rail.

As discussed above and in some implementations with multiple sliding doors, a second rail and a second turntable and plater may be utilized to load parts from two sides of the enclosure. In some implementations, this may result in increased throughput, as during the spraying and curing processes, other parts may be loaded or unloaded. In some implementations, a single rail may extend from outside one end of the enclosure, through the enclosure, and out through another end or side of the enclosure. It will be appreciated that the rail may be oriented in various positions (e.g., linear, curved, etc.) within the scope of the present disclosure. In some implementations, the rail may be driven by various servo motors, servo drives, etc. For example the rail may be driven by a servo drive (e.g., such as the Aries Servo Drive produced by Parker Hannifin Corporation of Cleveland, Ohio) and controlled via an analog +/−10V signal. In some implementations, the automated turntable (e.g., turntable 502) may be driven via a servo drive, also with an analog +/−10V signal. These servo drives may allow for built-in closed loop control of the rail when paired with a compatible motor and encoder. This may eliminate the need for a dedicated real-time control computer. These servo drives may allow for fine-tuned control of the system and may integrate easily with a number of available motor/encoder pairs. In addition, this approach may allow integrated control of multiple axes from a single drive unit. However, it will be appreciated that various servo drives and motors may be used within the scope of the present disclosure. Additionally, while an analog signal of +/−10V has been described, it will be appreciated that various types of signals with various amplitudes, phases, and/or frequencies may be used to control the rail and/or the turntable.

As discussed above and in some implementations, the at least one robot may include a robotic arm. In some implementations, the robotic arm may be positioned within the enclosure. For example and referring also to FIG. 9, the robotic arm (e.g., robotic arm 206) may be positioned within the enclosure. In some implementations, the robotic arm may be positioned at least partially within the enclosure. For example and referring also to FIG. 5, the robotic arm (e.g., robotic arm 206) may be positioned at least partially within the enclosure. In this example, the enclosure may include an open side (e.g., side 508) and/or a door configured to open and close to permit access of at least a portion of the robotic arm. An example of the robotic arm may include the Universal Robots UR10 manipulator. This manipulator, used with various control algorithms (e.g., robotic control algorithms available from Energid Technologies), may be used in conjunction with the rail and turntable to provide maskant applicator access to all areas of a part. In some implementations, active collision control will prevent collisions between the manipulator, the part, and the system enclosure. An additional advantage of the UR10 is the flexibility of its control system. For example, the UR10 may provide a set of both analog and digital I/O slots, removing the need for a dedicated I/O card in an interface computer (e.g., computing device 12). In some implementations, the digital I/O slots may be used to interface with the emergency stops (e.g., emergency stop 210) and safety switches, additional motion axes, and/or the robotic coating application system. While the Universal Robots UR10 manipulator has been described above as an example robotic arm, it will be appreciated that any robotic arm or other manipulator may be used within the scope of the present disclosure.

Figure 9:
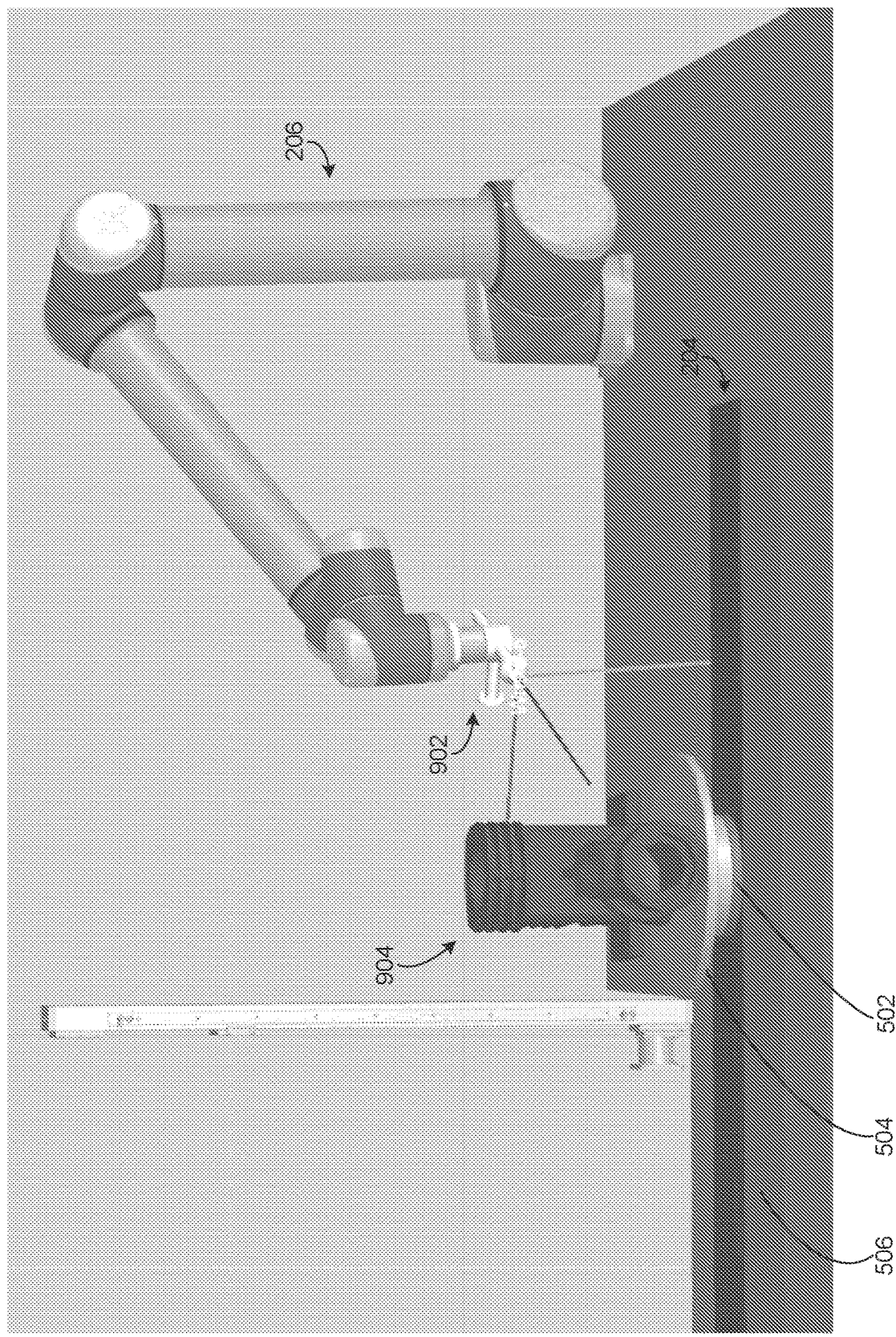
FIG. 9-11 are diagrammatic views of an end effector coupled to a robotic arm of a robotic coating application system according to one implementation of the robotic coating application system of FIG. 2.
Figure 10:
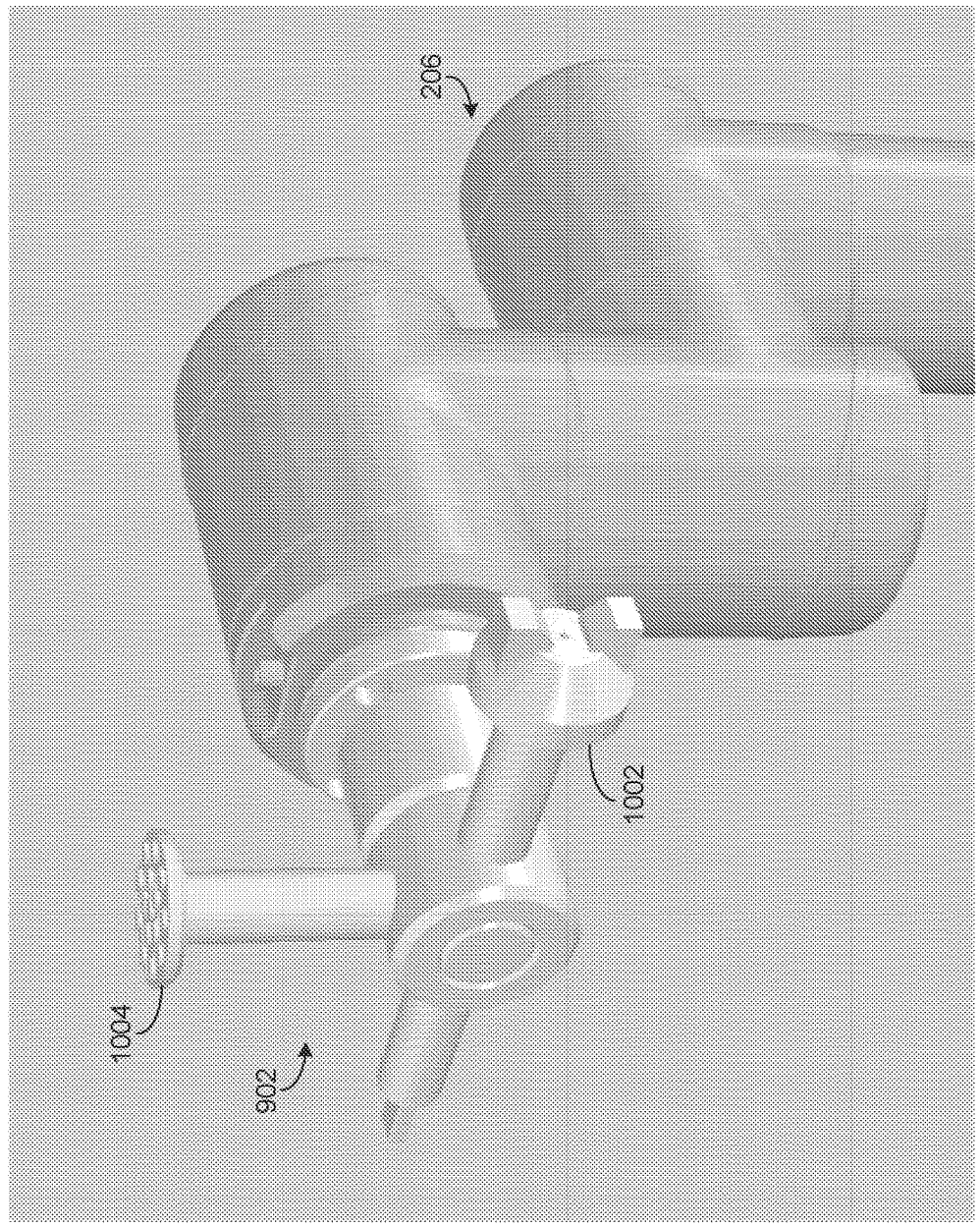
Figure 11:
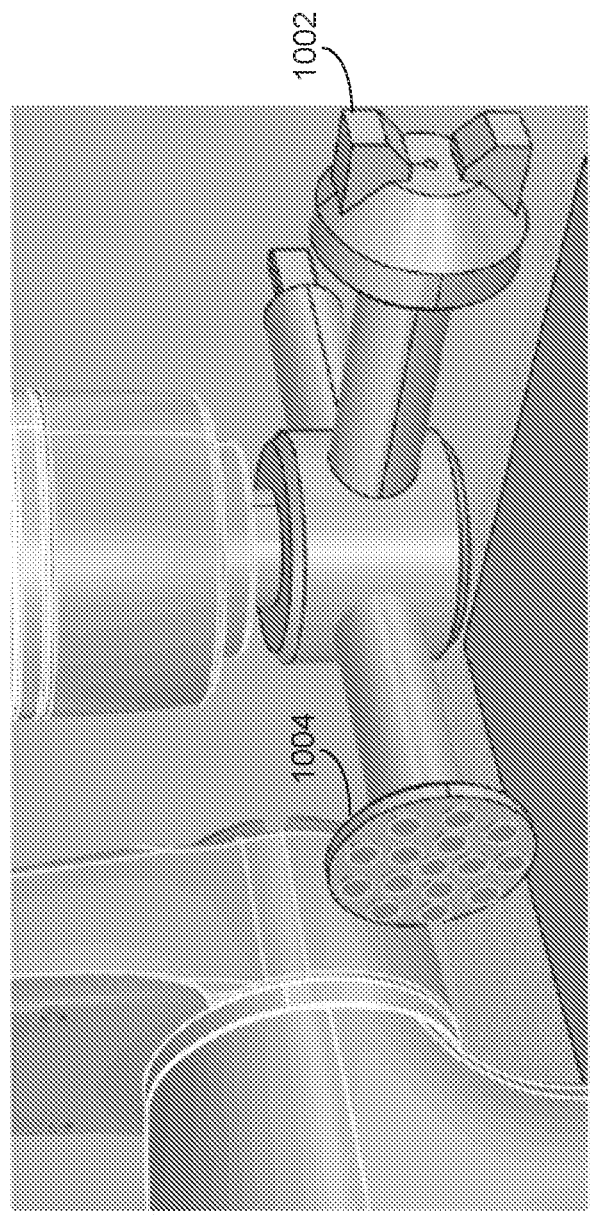
Figure 12:
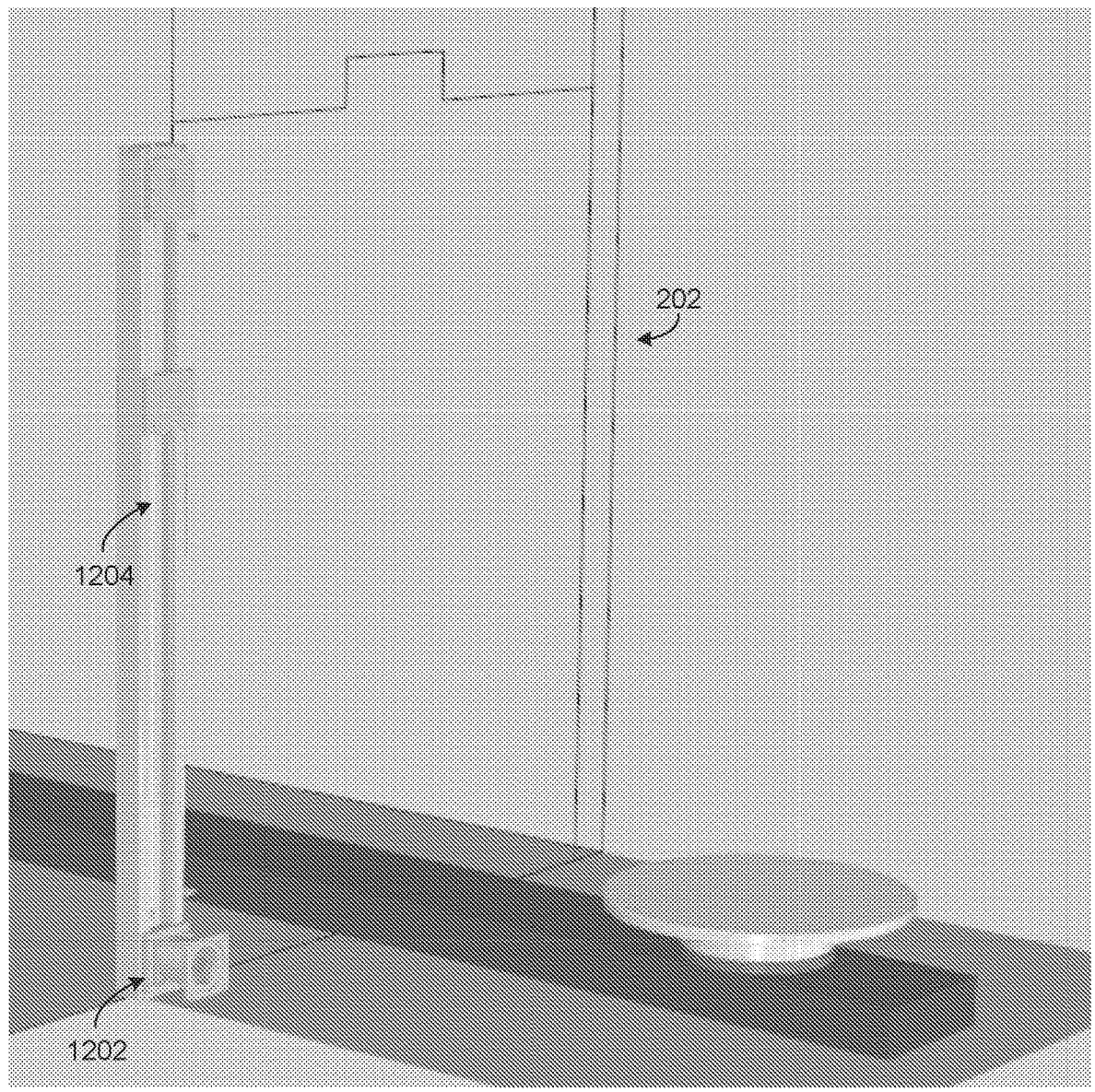
FIG. 12 is a diagrammatic view of a scanner according to one implementation of the robotic coating application system of FIG. 2.

In some implementations, the robotic arm may include an end effector configured to perform scanning or applying of the coating. Referring also to FIGS. 9-11, the robotic arm (e.g., robotic arm 206) may include an end effector (e.g., end effector 902) configured to perform scanning, configured to apply a coating, and/or configured to provide UV light curing capabilities on a part (e.g., part 904). In some implementations, the end effector may include separate ends or portions. For example, a scanning end, a spray gun end, and/or a UV light curing end may be releasably coupled to the robotic arm to perform their respective function. In some implementations, the end effector may be an indexable head with a plurality of functional portions. For example and referring also to FIG. 10, the indexable head may include a coating applicator portion (e.g., coating applicator portion 1002), a UV light curing portion (e.g., UV light curing portion 1004) and/or a scanning portion. While three example portions of indexable head have been described, it will be appreciated that any number of portions with various functions may be utilized within the scope of the present disclosure. In some implementations, duplicate or backup portions may be included in an indexable head. In some implementations, various coating applicator portions may be utilized. For example, a syringe-type coating applicator portion may be used for small holes, tight corners, and/or narrow channels of a part. A spray-type coating application may be used for large areas, shallow curves, and/or large through-holes of a part. In some implementations, a pump-fed brush may be used for large areas of a part with tight edge tolerances. It will be appreciated that other coating applicator portions may be used within the scope of the present disclosure.

In some implementations, the robotic coating application system may comprise a scanner configured to scan the part. For example, various sensors and scanners may be used to determine the shape and material composition of the part to either 1) match the part with a database to establish masked areas or 2) present the part to a user to define the masked areas. In some implementations, laser scanners and/or cameras may be used. In some implementations, a color camera may be used. In some implementations, a filter may be applied to the camera lens to allow the camera to only see the projected laser line from the laser scanner. The laser scanner may establish the shape, and the camera may refine the shape and confirm material properties. The sensors may provide reliable part analysis and categorization.

In some implementations, the robotic arm may be configured to hold the scanner. For example, a robotic arm (e.g., robotic arm 206) may hold a scanner. In some implementations and as discussed above, the scanner may be integrated into the end effector as a scanning portion. Referring also to the example of FIG. 12 and in some implementations, the scanner may be detachably affixed to the enclosure. For example, a line scanner (e.g., scanner 1202) may be mounted on the system enclosure, outside of the mask application area. In some implementations, the scanner may be configured to move about the part (e.g., along a vertical axis for the line scanner of FIG. 12) to scan the part. In some implementations, where the scanner is mounted on the enclosure, a scanner rail (e.g., scanner rail 1204) may be mounted outside of the enclosure and travel vertically the length of the part being scanned. For example, the scanner may move up and down the scanner rail to various positions relative to the part. This, combined with actuation capabilities of the turntable, may provide sufficient range of motion to fully scan and characterize various parts.

Figure 13:
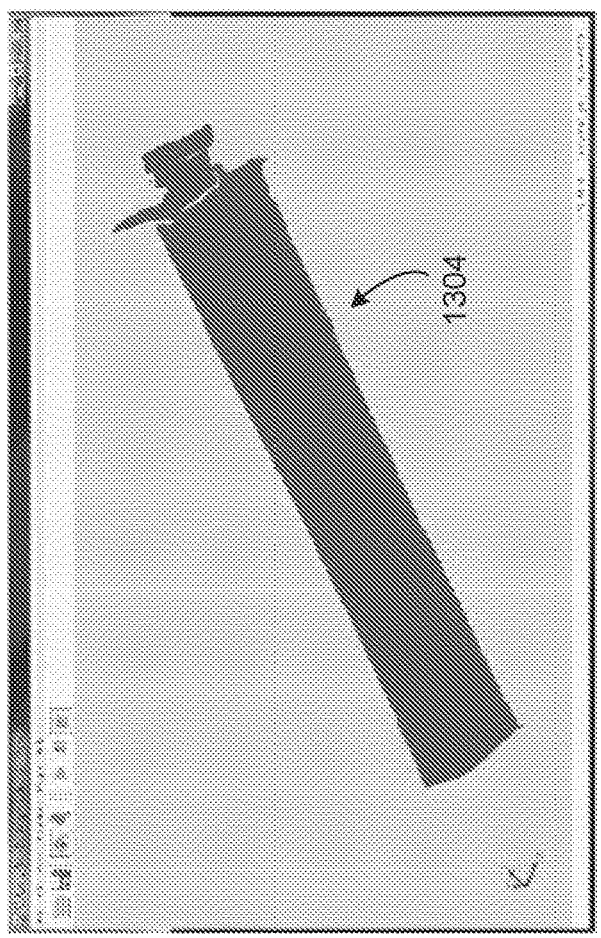
FIG. 13 is a diagrammatic view of a part modeled by the robotic coating application system according to one implementation of the robotic coating application system of FIG. 2.
Figure 13:
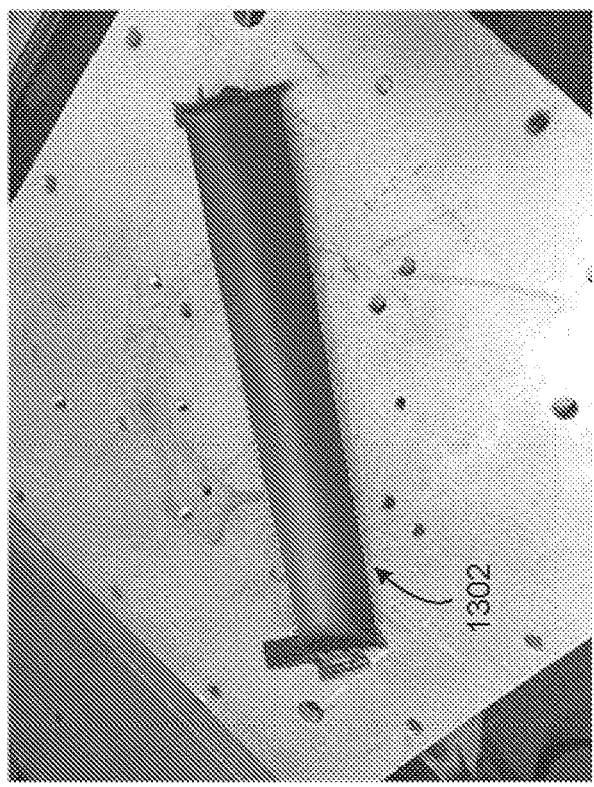
Figure 14:
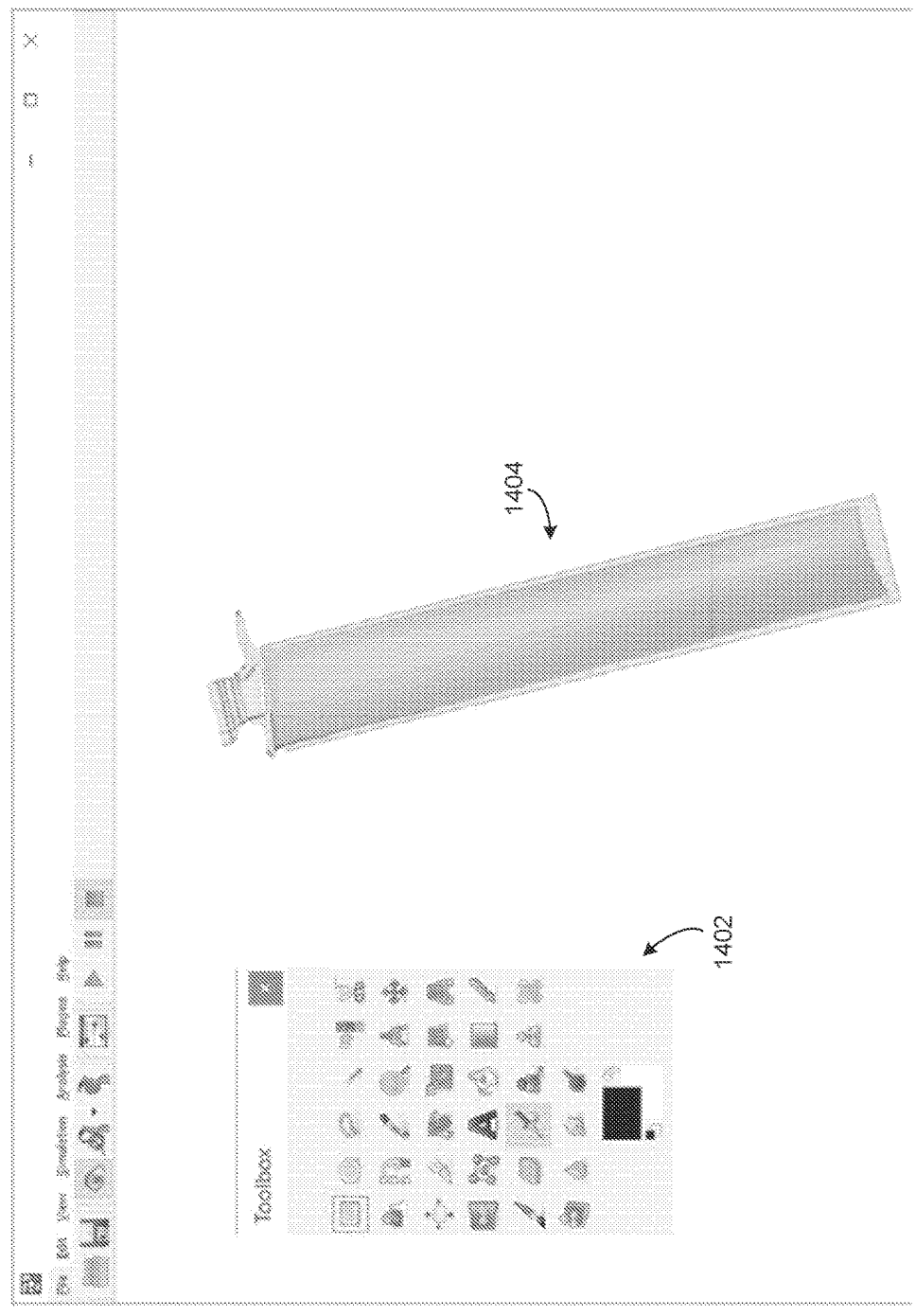
FIG. 14-15 are graphical user interfaces according to one or more implementations of the present disclosure.

In some implementations, the robotic coating application system may comprise at least one processor configured to generate the model of the part. Referring also to FIG. 13 and in some implementations, a part (e.g., part 1302) to be masked may be received and scanned. Three dimensional (3D) scanning of the part may provide or determine the depth information required to create a computer aided design (CAD) model (e.g., usable by CAD applications (e.g., CAD application 64)) and may guide the masking process. These CAD models may form the basis of the interface presented to the operator (through a graphical user interface). In the example of FIG. 13, the model may be captured from the left (e.g., part 1302) and re-rendered in another orientation on the right (e.g., model 1304). In some implementations, sensor data may be interpreted by various algorithms provided by 3D sensing libraries in robotic coating applications and other software tools. In some implementations, these software tools may support the integration and fusion of multiple sensor types in determining part information. As will be discussed in greater detail below, this information may be used to identify and register components to be masked in a two-step process.

In some implementations, a laser line scanner may scan incoming parts and compare them against the nominal drawing dimensions of the part. This may allow masking processes to be customized to the precise part being masked, and can prevent masking errors due to small variations in part tolerances. An example part (e.g., part 1302) and its corresponding laser-scanned point cloud (e.g., model 1304) are shown in FIG. 13. In some implementations, the 3D model (e.g., model 1304) may be composed of thousands of individual points, each representing a scan point of the scanner.

In some implementations, the robotic coating application system may comprise a graphical user interface to display a model of the at least one part and allow a user to select a portion or subportion of the model for application of a coating. For example, and referring also to FIGS. 14-15, the graphical user interface (e.g., GUI 1400) may include a plurality of features (features 1402) and selections that allow an operator to easily "paint" the masking zones onto the part (e.g., model 1404), utilizing either basic shapes or freeform tools (similar to a spray gun or other coating applicator used in manual masking). In some implementations, additional features may allow for the use of more elaborate dimensioning and/or placement on the part, depending on the accuracy required. In some implementations, the user selections of portions or subportions of the model for application of a coating may define masking procedures or a masking process for that model. As will be discussed in greater detail below, the masking procedure for each model may be stored and retrieved for subsequent use with similar parts.

Figure 15:
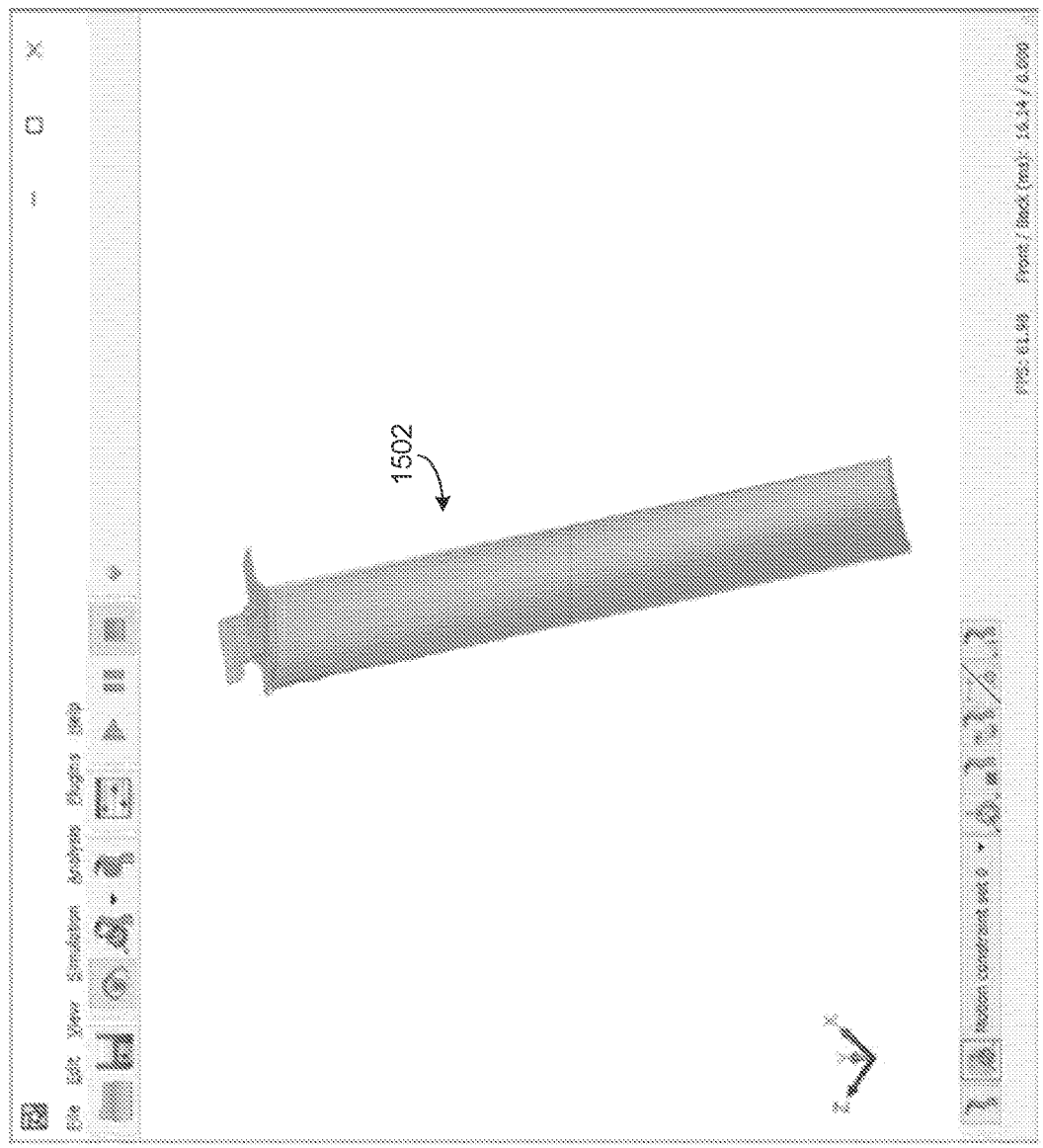

In the example of FIG. 15, false-color overlays may be applied to the model of the part (e.g., model 1502) to represent different masking techniques to be applied to each area of the part. For example, a first color (e.g., red) may indicate areas that should not be masked. A second color (e.g., blue) and a third color (e.g., green) may indicate areas that should be masked with distinct techniques (e.g., a syringe application or a spray application). It will be appreciated that various coating techniques and portions of a part may be selected in the graphical user interface within the scope of the present disclosure. In some implementations, the graphical user interface may be configured to provide a reasonable guess at what an experienced operator might select in terms of flow rate, approach angle, application technique, and/or edge tolerance for each portion or subportion of a part. For example, a computing device may analyze various surface and geometric properties, such as curvature, the distance to closest surfaces, etc. of the part. Based on these part properties, the flow rate, approach angle, application technique, and/or edge tolerance for coating each portion or subportion may be suggested to the operator using the graphical user interface. In some implementations, the graphical user interface may overlay the 3D part view with the different masking techniques to be applied in each region. The operator can adjust these regions using e.g., mouse-based input to accommodate the "as delivered" part geometry.

In some implementations, if a CAD model is available of a part, this model may be converted to a format compatible with a robotic control application (e.g., robotic control application). If no model exists, the part may be scanned using the integrated laser line scanner. In some implementations, a triangular mesh may be fit to a point cloud generated for the part to provide a more efficient way to reason with the geometry. As discussed above, an operator may specify, via the graphical user interface, which regions of the part are to be masked and the type or coating technique by which the portion or subportion of the part is to be coated.

In some implementations, an operator may manually mask the part a single time, place it in the laser scanner/imaging system, and the robotic coating application system may automatically detect the regions of the part that are masked by color.

Figure 16:
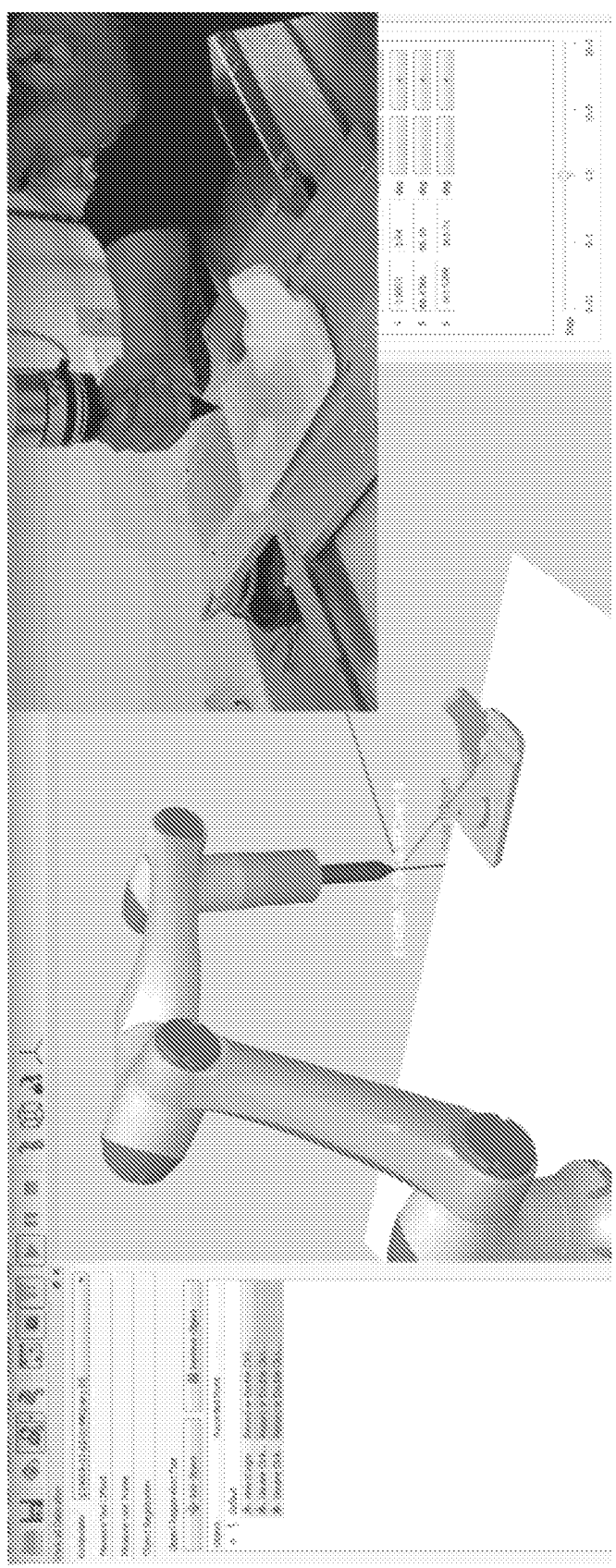
FIG. 16 is a diagrammatic view of a robotic coating application system during training mode according to one implementation of the robotic coating application system of FIG. 2.

Referring also to FIG. 16 and in some implementations, the robotic coating application system may be placed or set in a "training" mode, which may allow operators to manually move the robotic coating application system (e.g., the robotic arm) over the masked regions of the part. For example, using the at least one robot, while in a training mode, a portion or subportion of the model may be selected for the application of the coating. During a training mode or training process, experienced masking technicians may program the masking zones and features. The capture process may allow trainers to specify masking areas and/or how a masking motion or technique should be implemented within various portions or subportions of a part.

Figure 17:
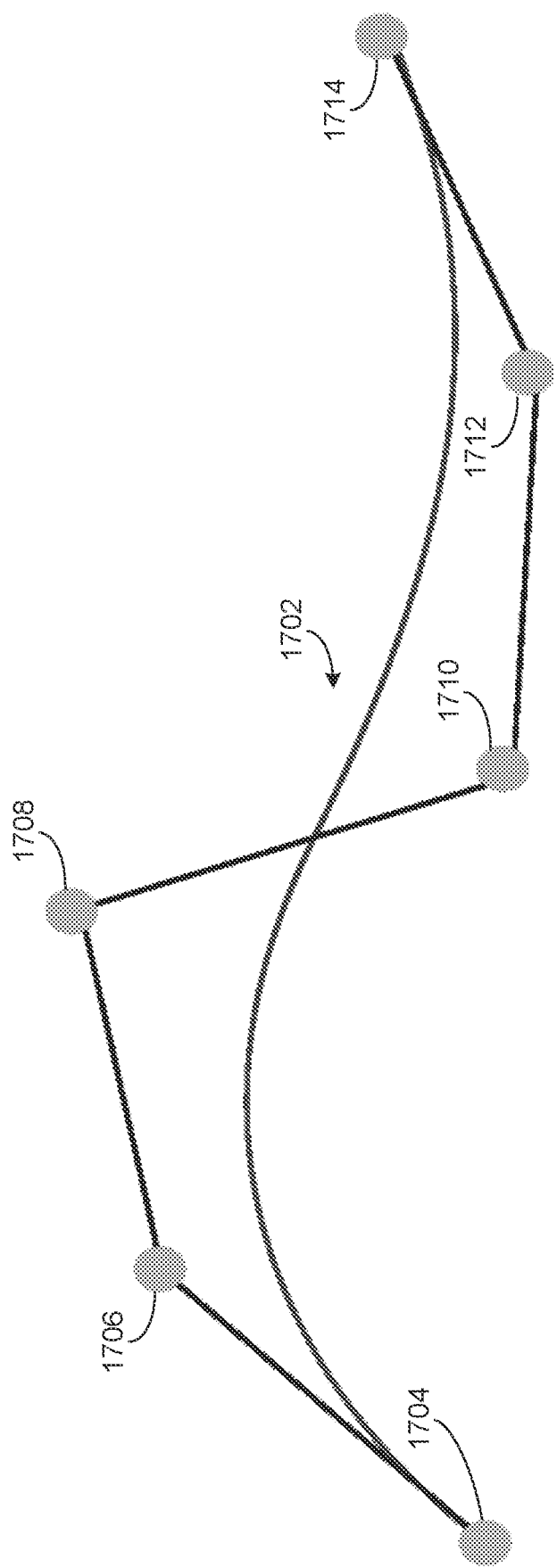
FIGS. 17-19 are diagrammatic views of modeling techniques according to implementations of the robotic coating application system of FIG. 2.

In response to the user selection of the portion or subportion of the model for application of a coating, the model, in conjunction with identifying part information and the masking information may be stored in a database for future retrieval. In this manner, the robotic coating application system may store the precisely delineated masking zones on the complex geometry of a part. In some implementations, arbitrary shapes can be represented many different ways. Solid modelling packages such as SolidWorks™ may represent these shapes as a combination of their mathematical definitions. That is, when calculating dimensions, tolerances, etc., the values yielded are accurate to within the precision of the machine. Arbitrary curves can be represented as Non-Uniform Rational Basis Splines (NURBS). For example, parameterized curves (e.g., parameterized curve 1702) may defined by a set of points (e.g., points 1704, 1706, 1708, 1710, 1712, 1714) as shown in FIG. 17. These approaches may generally allow the geometry of a system to be precisely defined and reasoned with. Unfortunately, their precision also makes them computationally intensive. For a system such as CAD, which can deal with hundred millisecond delays when calculating distances, these are an excellent fit. However, for the real-time time and control needs of robotic systems, they may be too slow.

Figure 18:
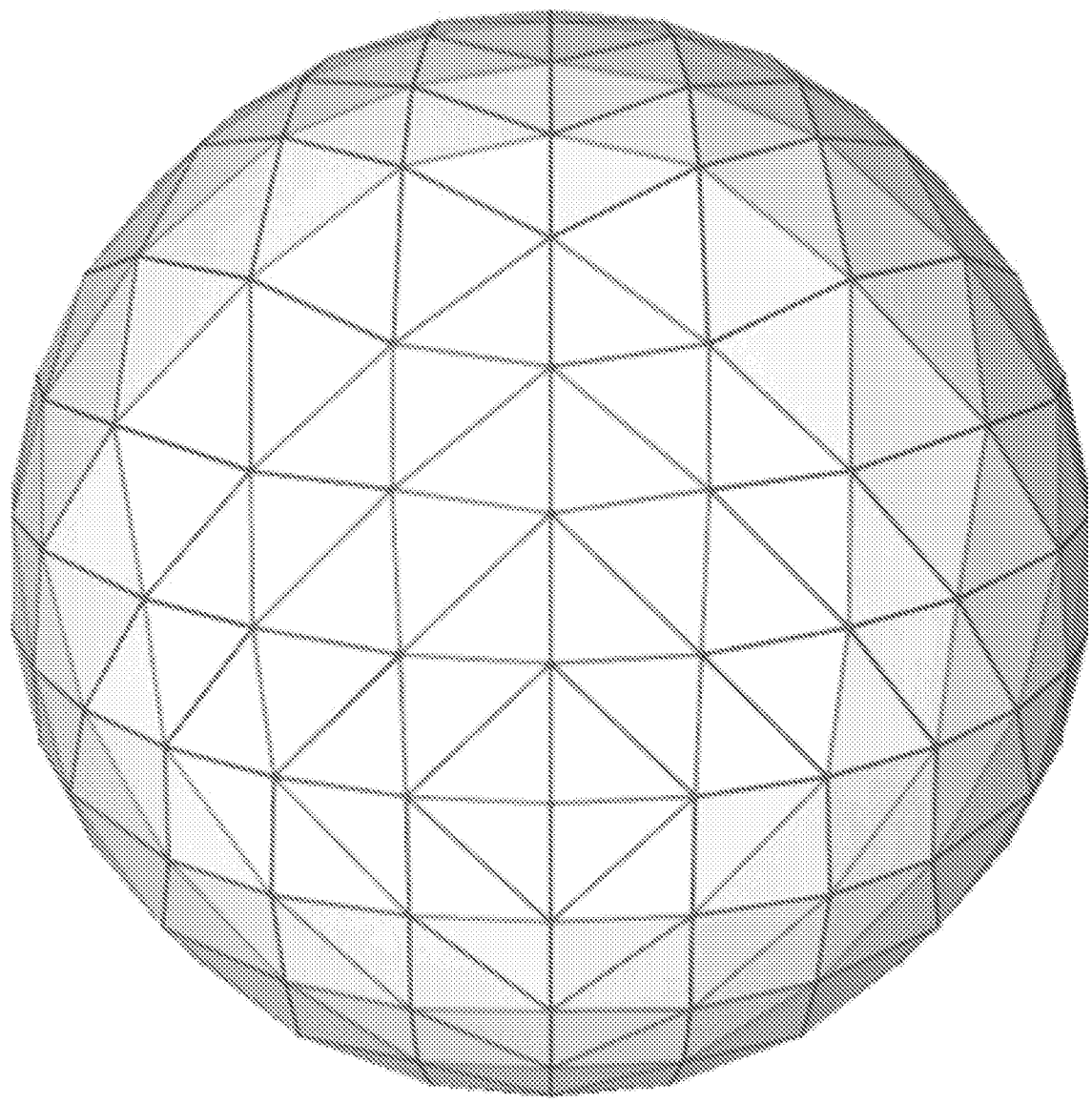

Rather, as in many other simulations and computer graphics applications, geometry is represented as a mesh of triangles, as shown in FIG. 18. Because there is only a single type of geometry to be considered (e.g., a triangle), extreme optimization of many calculations is possible. This is what allows GPUs to provide such a significant performance improvement in graphics applications. For example, the calculations required to render each triangle are easily parallelizable across hundreds or thousands of computing cores.

However, as is apparent in FIG. 18, almost any geometry represented with this approach is simply an approximation. Adding a finer mesh means more triangles and a drop in performance. It also eliminates the ability to reason about the geometry on a deeper level. For example, a sphere simply becomes a set of triangles and the system may no longer track its radius. Regardless, the performance benefits of this approach are significant enough to warrant using this approach.

Figure 19:
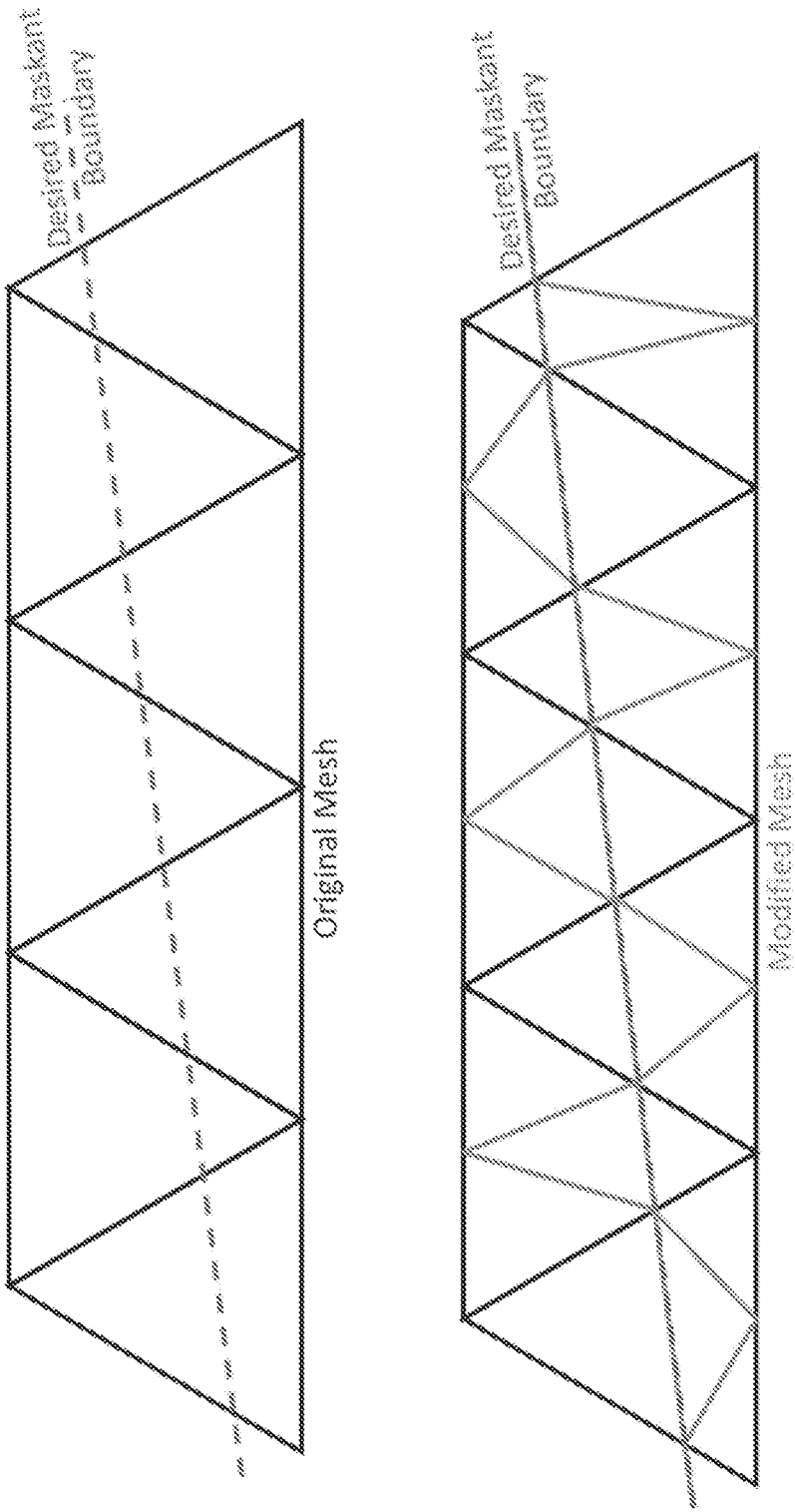

For the masking interface, storing masking zones within the geometric models may reduce accuracy. For parts requiring precision application of maskant, the triangular mesh may be too coarse to properly represent the zone. To accommodate this, the mesh may be locally modified to precisely represent the boundaries of the masking zones. For example, the triangles may be subdivided along the specified boundaries, to align the borders of the masking zone with the edges of the new triangles. An example of this approach is shown in FIG. 19.

Figure 20:
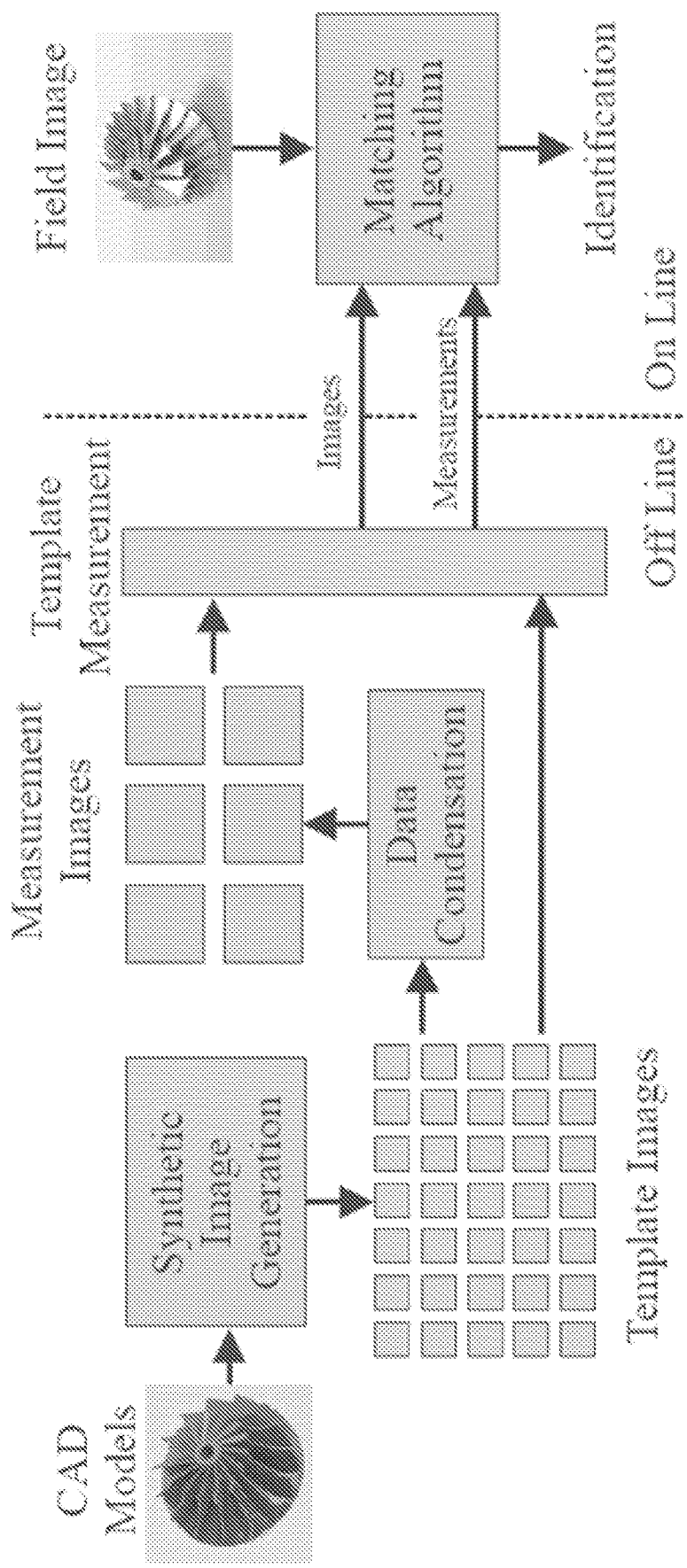
FIG. 20 is a flow chart of one implementation of the robotic coating application process according to one implementation of the present disclosure.
Figure 21:
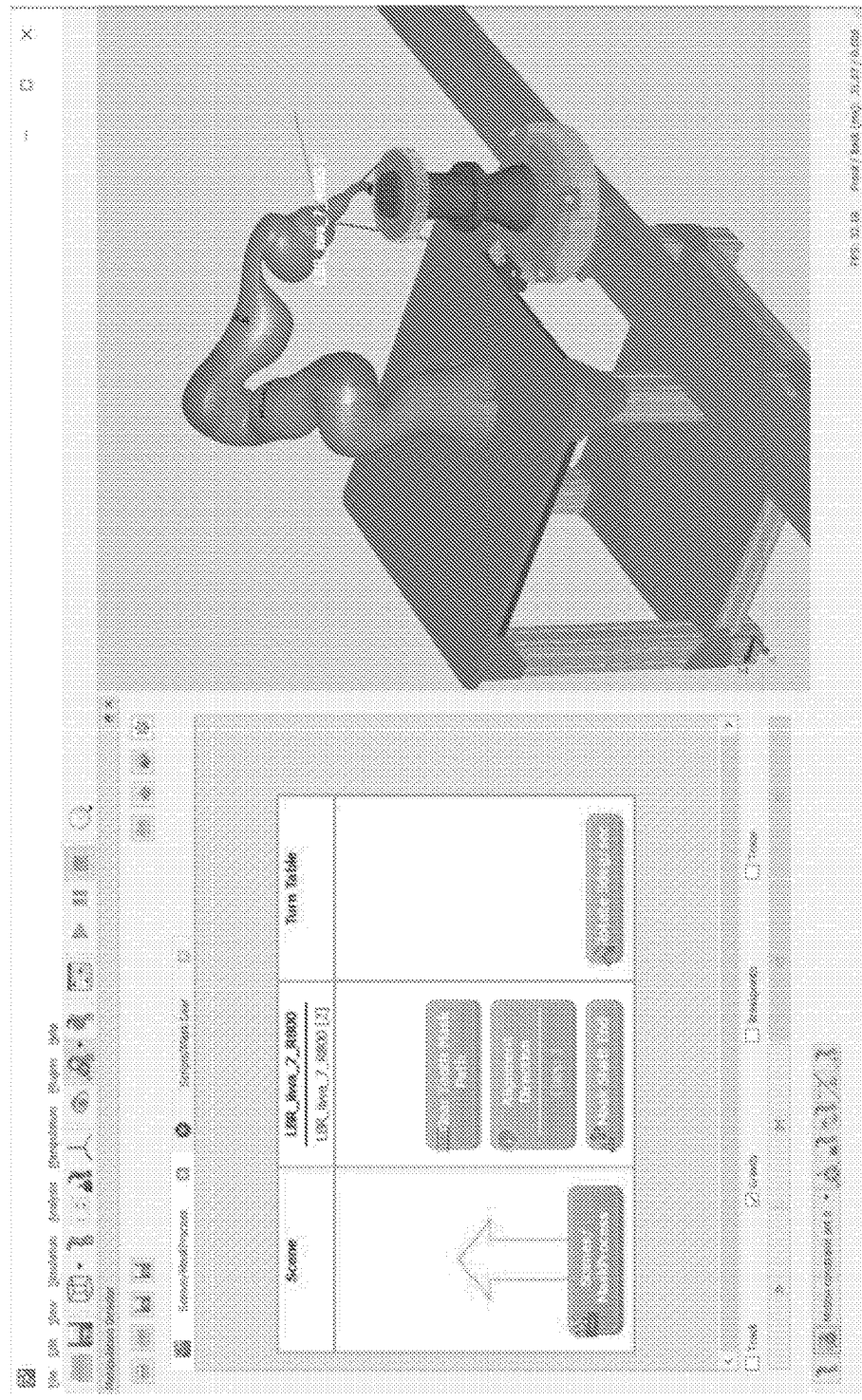
FIG. 21 is a graphical user interface according to one implementation of the present disclosure.
Figure 22:
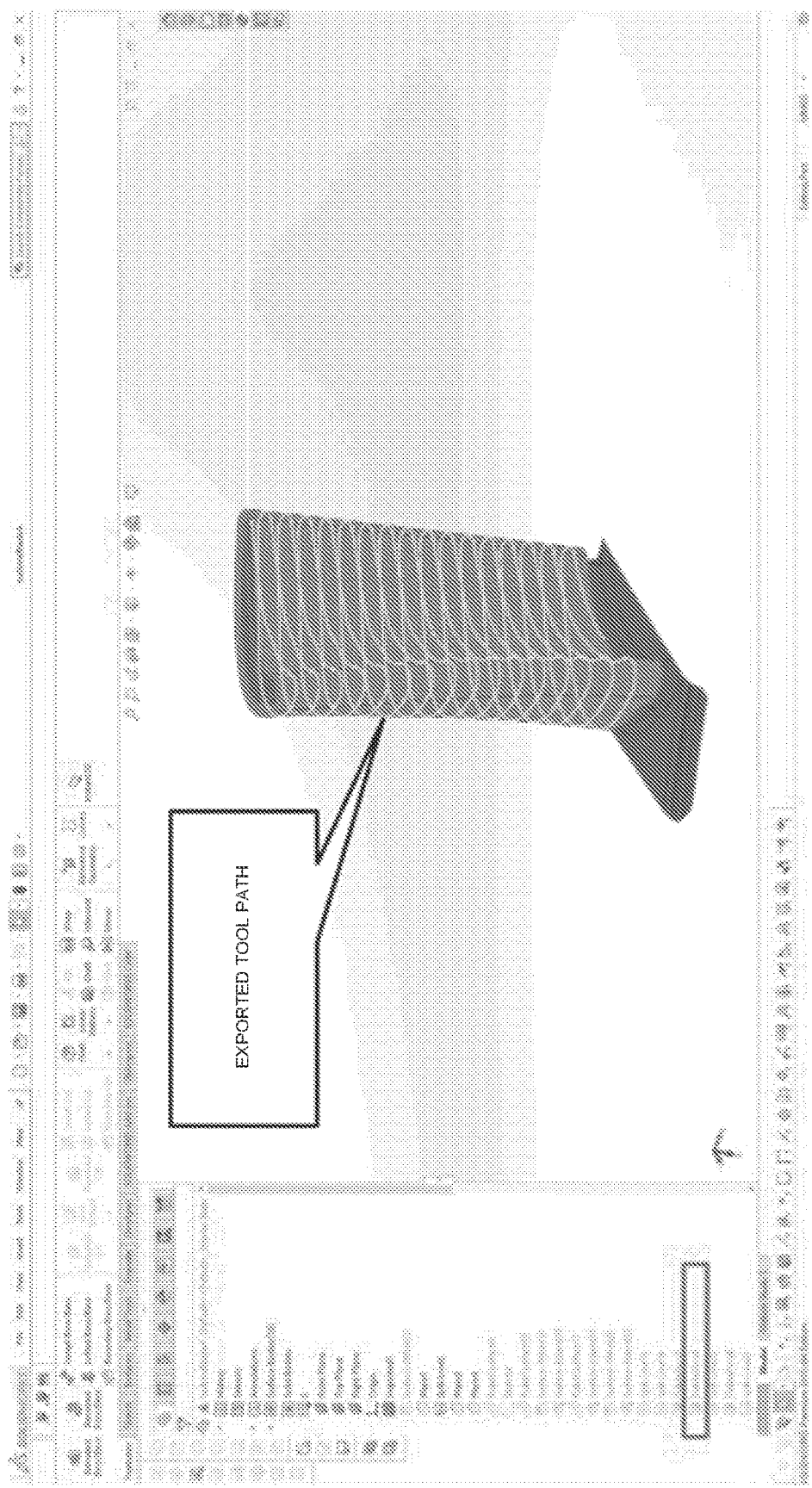
FIG. 22 is a diagrammatic view of a tool path generated in a computer aided design (CAD) application for modeling parts according to one implementation of the present disclosure.

In some implementations, the robotic coating application system may comprise a computing device configured to retrieve a model of the at least one part. Referring also to FIG. 20, a two-step process for comparing and retrieving models is shown. In the offline step of this process, a subspace may be created per group of objects whose shape and appearance is captured using the sensors. The offline creation of this subspace and the subsequent employment of it to create an initial estimate of the target type and pose may be performed in an initial type pose and geometry (ITPG) module, as discussed in Chang, C. Y., Maciejewski, A. A., Balakrishnan, V., Roberts, R. G., & Saitwal, K. (2007). Quadtree-based eigendecomposition for pose estimation in the presence of occlusion and background clutter. *Pattern Analysis & Applications*, 10(1), 15-31. The grouping for the objects may be sent to ITPG is determined by a feature based classifier, as discussed in Theodoridis, S. and Koutroumbas, K., (1999). "Pattern Recognition", Academic Press, San Diego, Calif. During the online process, the input image is first segmented and then classified by the feature based classifier. In some implementations, the ITPG processor may project the segmented image into the appropriate subspace and may find the closest match from the training signatures. The result from ITPG is typically a rough estimate that can be refined by the refinement process known as the refined type, pose, and geometry (RTPG) processor. In RTPG, a CAD model of the candidate object is rendered iteratively to match the input image. Together this process allows parts to be masked, masking tools, and robotic components to be tracked in 3D.

The approach shown above will allow the localization of flaws and the identification of challenging masking procedures. By matching nominal shapes, variations in parts (due to either repair operations or damage) can be identified. These variations will be presented to the operator through an image similar to that shown in FIG. 13, and the operator may confirm sizes and procedures.

In some implementations, a coating may be automatically applied to the at least one part based upon, at least in part, the user-selected portion or subportion. Once masking procedures are established for components of a part, these masking procedures may be combined by allowing an operator to drag procedures from a database graphically into an execution matrix displayed on a graphical user interface. For example and referring also to FIG. 21, the graphical user interface (e.g., graphical user interface 2100) may include tools for adding masking processes for components to a database, then applying them through blocks in a graphical process design. The graphical process matrix may have a column for each robot or other component in the system, with steps added through boxes that are sequentially implemented and linked to steps for other components. Boxes across columns may be tied together so that, for example, one box always waits for another to complete. Blocks can easily be modified using the graphical user interface and the ordering of subtasks can easily be modified by dragging, cutting, and pasting blocks in the scripting window. This may provide a convenient way to graphically control the masking process.

The operation process described above may be implementable graphically, with the ability to save this to a file and edit it graphically. In addition, components of the configuration may be saved using a spreadsheet application or the like. The blocks, their configurations, and contingencies, may be saved into cells. In this manner, the process may be edited and/or saved using a spreadsheet application as well.

In some implementations, selecting the portion or subportion of the part for coating via the user interface may include defining a tool path for the robotic arm of the robotic coating application system to follow when applying the coating to the part. A tool path may generally include a path of the coating applicator in order to coat the part according to a desired coating application. For example, the tool path may include the movement of the coating applicator in relation to the part in order to coat part. Tool paths may be defined by various applications external to robotic coating application and may be imported into a robotic coating application. For example and referring also to FIG. 22, a tool path may be defined in another application (e.g., SolidWorks) and may be imported into a robotic coating application. In some implementations, robotic coating application system may automatically define a tool path for coating the part using a mathematical model of the masking region and one or more metrics to be optimized by changing the path.

Figure 23:
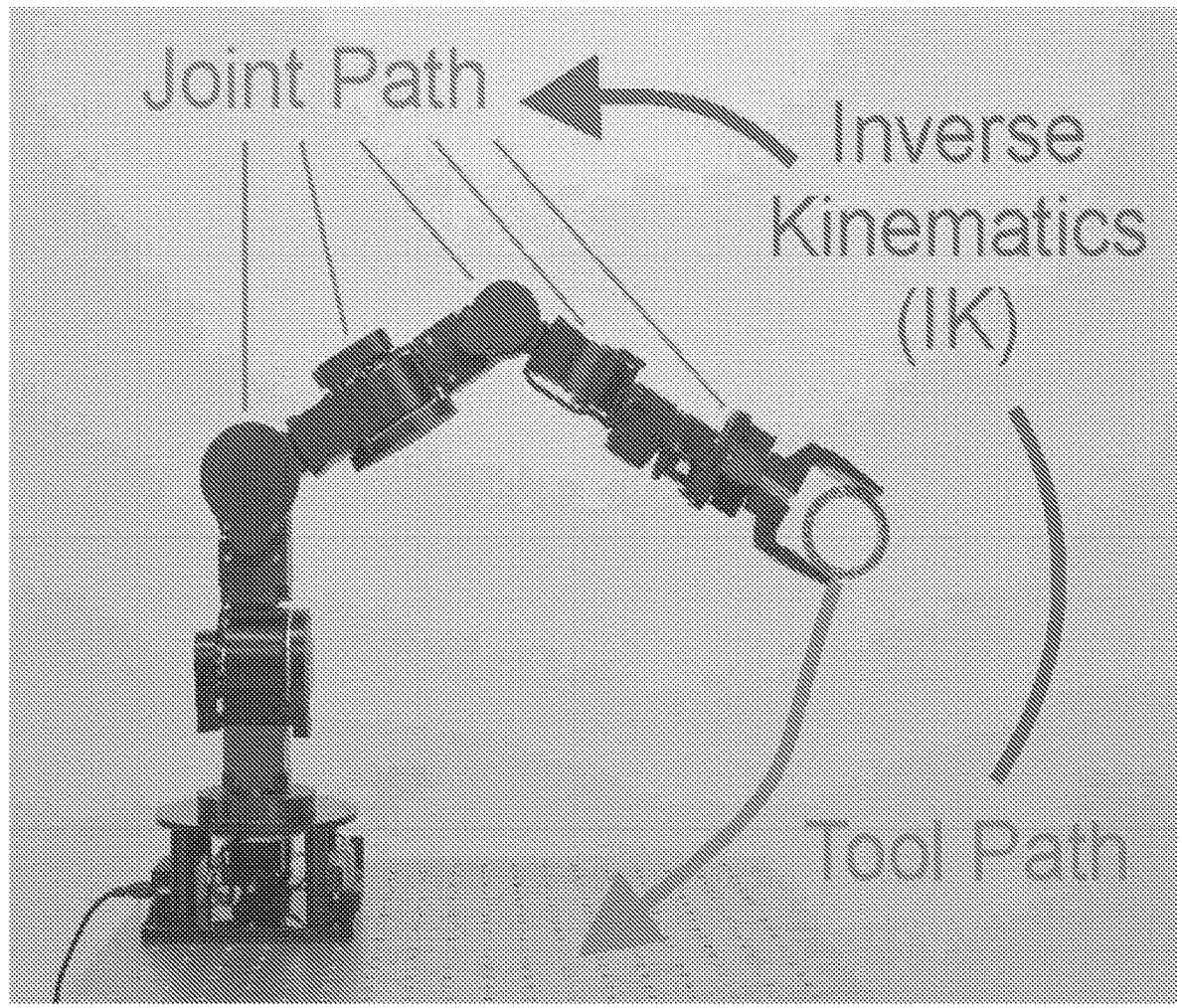
FIG. 23 is a diagrammatic view of inverse kinematics according to one implementation of the robotic coating application system of FIG. 2.

In some implementations, automating applying the coating application may include converting the user selection of the portion or subportion of the part into various control commands for the at least one robot. For example and as shown in FIG. 23, given a desired path for an applicator over the surface of the part being masked, the robotic coating application system may set the individual joint motions to achieve this desired tool motion using Inverse Kinematics (IK). Inverse kinematics, including coordinating multiple articulating systems (like the robot arm holding the applicator and the articulated turntable proposed in this document) may be resolved by robot control applications (e.g., robotic control application 20). A joint path may be calculated that satisfies the tool path while optimizing performance criteria. Both constraints and optimizations can be changed at run time, allowing adaptive algorithms that are robust in real-world applications. Accuracy might be optimized for some operations, for example, while time is optimized for others. Graphical tools may be provided for easily configuring constraints and optimizations for a control system. Libraries and header files may also be provided that can be used with any C++ project to easily add these capabilities. Standards-based Extensible Markup Language (XML) may be used for configuration. The result is a system that can easily be expanded to adapt to new requirements and challenges, and is easily integrated into other tools used in the overhaul and repair process.

The proposed masking system will support a variety of robot types, masking procedures, part shapes, and sensors. The control of the robot hardware within robotic coating application system may be integrated with the control of a masking application. Control of the end effectors of the robotic arms is accomplished using two primary components: the inner velocity controller and the outer position controller. This combined control system allows the masking program to "fly" the end effector throughout task space by specifying a desired placement, and joint velocities and positions are calculated automatically. This frees the operator to focus on the task, rather than low-level control of the robot.

In some implementations, the core velocity framework is based on the manipulator Jacobian equation, as provided below in Equation 1:

$$V = J(q)\dot{q}$$

Here V is an m-length vector representation of the motion of the hand or hands (usually some combination of linear and angular velocity referenced to points rigidly attached to parts of the manipulator); q is the n-length vector of joint positions (with $\dot{q}$ $\dot{q}$ being its time derivative); and J is the m×n manipulator Jacobian, a function of q. (For spatial arms with a single end effector, V is often the frame velocity with three linear and three angular components. In this document, it takes on a larger meaning that includes the concatenation of point, frame, or other motion of multiple end-effectors.) The Jacobian J(q) is the matrix that makes (1) true for all possible values of $\dot{q}$ $\dot{q}$. Note V can represent a concatenation of values for multiple end effectors, enabling coordinated motion of multiple points on the manipulator.

The velocity control may be defined as the following question: given a desired hand motion V, what are the joint rates $\dot{q}$ that best achieve this motion? To answer this, the framework is built on a method that uses a scalar a, a matrix function W(q), and a scalar function ƒ(q) to solve for q̇ given V through the following formula, as shown below in Equation 2.

$$\dot{q} = \begin{bmatrix} J \\ N_J^T W \end{bmatrix}^{-1} \begin{bmatrix} V \\ -aN_J^T \nabla f \end{bmatrix} \quad (2)$$

where Δf is the gradient of f and $N_J$ is an n×(n−m) set of vectors that spans the null space of J. That is, $JN_J=0$, and $N_J$ has rank (n−m). Both Δf and $N_J$ are generally functions of q. By changing the values of a, W, and f, many new and most established velocity-control techniques can be implemented.

However, a more general framework may be created. Instead of insisting on the use of the gradient of a function, a general column vector F(q) is used. Not all vector functions are gradients. This minor, but important, modification yields the following formula, as shown below in Equation 3:

$$\dot{q} = \begin{bmatrix} J \\ N_J^T W \end{bmatrix}^{-1} \begin{bmatrix} V \\ -aN_J^T F \end{bmatrix} \quad (3)$$

This achieves the desired V while minimizing Equation 4:

$$\tfrac{1}{2}\dot{q}^T W \dot{q} + \alpha F^T \dot{q} \quad (4)$$

The parameters a, W and F can be defined using XML to give many different types of velocity control.

Equations (1) and (2) and (3) form the core velocity-control algorithm used for masking. Mathematically, this approach achieves the desired V while minimizing ½q̇$^T$W$_{q̇}$+a F$^T$q̇ as shown in (4). The parameters a, W, and F can be defined to give many different types of beneficial behavior, including collision and joint-limit avoidance. In its current implementation, the software allows users to define a set of motion constraints defining the masking tasks to define the vector V. These are defined through equality constraints. Inequality constraints may be added for controlling some distances in masking, joint limits, and collisions. In this case, there may be three sets of constraints. Equation (5) may be minimized:

$$\mu = \dot{q}^T W \dot{q} + a\, F^T \dot{q} \quad (5)$$

subject to Equation 6:

$$J(q)\dot{q} = V \quad (6)$$

and Equation 7:

$$h(q) \le U. \quad (7)$$

Here h(q) is a user-defined vector function, each element of which must be less than a corresponding scalar. At each time step, if the current state of the control system satisfies (7), there is some subset of the vector elements that can be constrained as unchanging to give a new solution that also satisfies (7). At a given time step, let the subset that must be constrained be defined as h*(q). This vector function can be defined using a selection matrix S composed of columns each of which has all zeros and a single unit as its elements. That is, as shown in Equation (8):

$$h^*(q) = Sh(q). \quad (8)$$

Let H(q) be defined as the Jacobian for h(q). Then the Jacobian for h*(q) is H*(q). It can be calculated as shown in Equation (9):

$$H^*(q) = SH(q), \quad (9)$$

though in practice it is better to calculate it directly by just selecting rows of H(q). This value will be used in a revised solution method as follows:

$$\dot{q} = \begin{bmatrix} J \\ H^* \\ N_{JH}^T W \end{bmatrix}^{-1} \begin{bmatrix} V \\ \dot{U}^* \\ -aN_{JH}^T F \end{bmatrix} \quad (10)$$

where $N_{JH}$ is a matrix with columns spanning the null space of the matrix formed by stacking J with H*. U̇* is the time rate of change of the values of U selected with S.

Care must be taken when calculating the selection matrix S. An optimum solution should have the minimum number of rows. A greedy approach to selecting S is to first try with empty S, i.e., evaluate (3), then select with S every element of h(q) that that solution violates and use this to establish H* for use in (10). This process can be continued until no violation remains or all degrees of redundancy are exhausted (in which case the arm is stopped). With this approach, there is guaranteed to be a solution to avoid violation of (7)—even though it might be stopping—because S=I will surely give no violation.

The array V, as used above, represents the motion of all the manipulator's motion constraints. A special class holds the description of motion constraint set, which contains any number of any type of end effectors. A point end effector, for example, gives three degrees of constraint, and a frame gives six. Each end effector is described using a string identifier for the link to which it is rigidly attached as well as an offset description. For forming kinematic entities—such as the Jacobian, J—the end effectors are concatenated.

Most motion constraints are rigidly attached to some link on the manipulator, and they can be attached in any way. Point end effectors, for example, can be attached with any offset, and frame end effectors can be attached with any offset and rotation. Some end-effectors are not attached to a specific link—examples include center-of-mass constraint and spatial momentum constraint. Some example end-effector types include: 2D positioning; 3D position; 3D orientation; 3D position and orientation; 3D center of mass; Linear joint-value constraints; and Spatial momentum constraint. Frame motion constraints (which fully define the positioning of the tool in both position and orientation), and a more specialized type known as the "Free Spin in Z" constraint may be used by robotic coating application system. This constraint imposes five degrees of constraint: full position (x,y,z), and two orientation angles. The third orientation angle (typically along the axis of a symmetric tool) may be left free to orient in a way that optimizes the reach of the manipulator. This constraint is especially useful for tasks such as curing and spraying with a symmetrical spray pattern.

As discussed above, embodiments of robotic coating application system may automatically apply a coating to at least one part based upon, at least in part, a user-selected portion or subportion, where the coating is applied via at least one robot configured to operate at least partially within an enclosure of the robotic coating application system.

Figure 24:
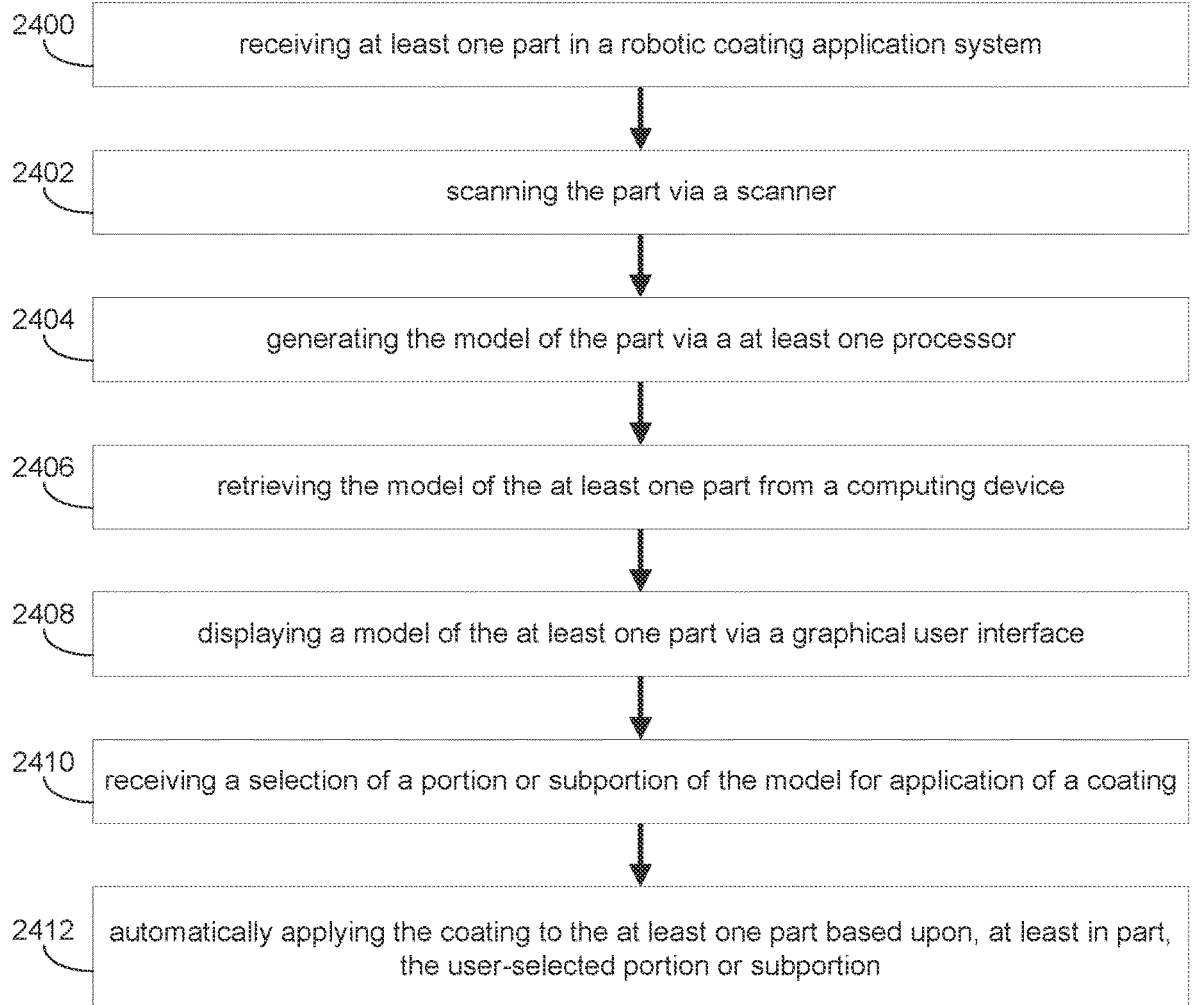
FIG. 24 is a flow chart of one implementation of the robotic coating application process of FIG. 1.

For example and referring also to FIG. 24, robotic coating application process 10 may coat at least one part with a robotic coating application system and may include receiving 2400 at least one part (e.g., in an enclosure) in the robotic coating application system. For example and as discussed above, at least one part may be received or loaded onto a turntable. In some implementations, the orientation/position of the part may not be critical. The rail may move the part to a scanning position.

Robotic coating application process 10 may include scanning 2402 the part via a scanner and generating 2404 a model of the part via a at least one processor. For example, the laser scanner may scan the part (with coordinated vertical axis and rail motion as needed), and may assemble a point cloud of the scanned data. The point cloud may be used to first match the part to a list of known parts (for which masking processes are defined). In some implementations, the position and orientation of the part may also calculated from the point cloud. Any potential defects or deviations from previously seen instances of that part are called out for approval by the operator. In some implementations where a masking process has been created for the at least one part, the masking process may be retrieved 2406 from the database, and displayed 2408 for operator approval.

In some implementations where a masking process has not already been created for the at least on part, robotic coating application process 10 may include displaying 2408 a model of the at least one part via a graphical user interface and receiving 2410 a selection of a portion or subportion of the model for application of a coating.

In some implementations, robotic coating application process 10 may automatically apply 2412 the coating to the at least one part based upon, at least in part, the user-selected portion or subportion For example, the actuated vertical door may be opened. The rail system may move the part into the spray enclosure, and the door may be sealed closed. The spray booth internal lighting and ventilation system may be turned on. The indexable end of arm tool may be set to the desired mask applicator. The robotic system may execute the masking procedure. A pump flow rate may be controlled via the robotic control software as the applicator is moved over the zones to be masked. Once masking is completed, the end of arm tool may be indexed to the UV Curing lamp. The internal lights of the enclosure may be turned off, and the UV curing lamp may be switched on. The lamp may be moved over a predetermined path at a set of predefined rates to ensure a full cure of the maskant. The UV Lamp may be switched off, and the internal lights within the enclosure may be switched on. After a brief period to allow fumes/particulates to settle, the exhaust system may be switched off. The vertical door may open, and the rail system may move the part out to the loading zone for operator inspection and removal.

Figure 25:
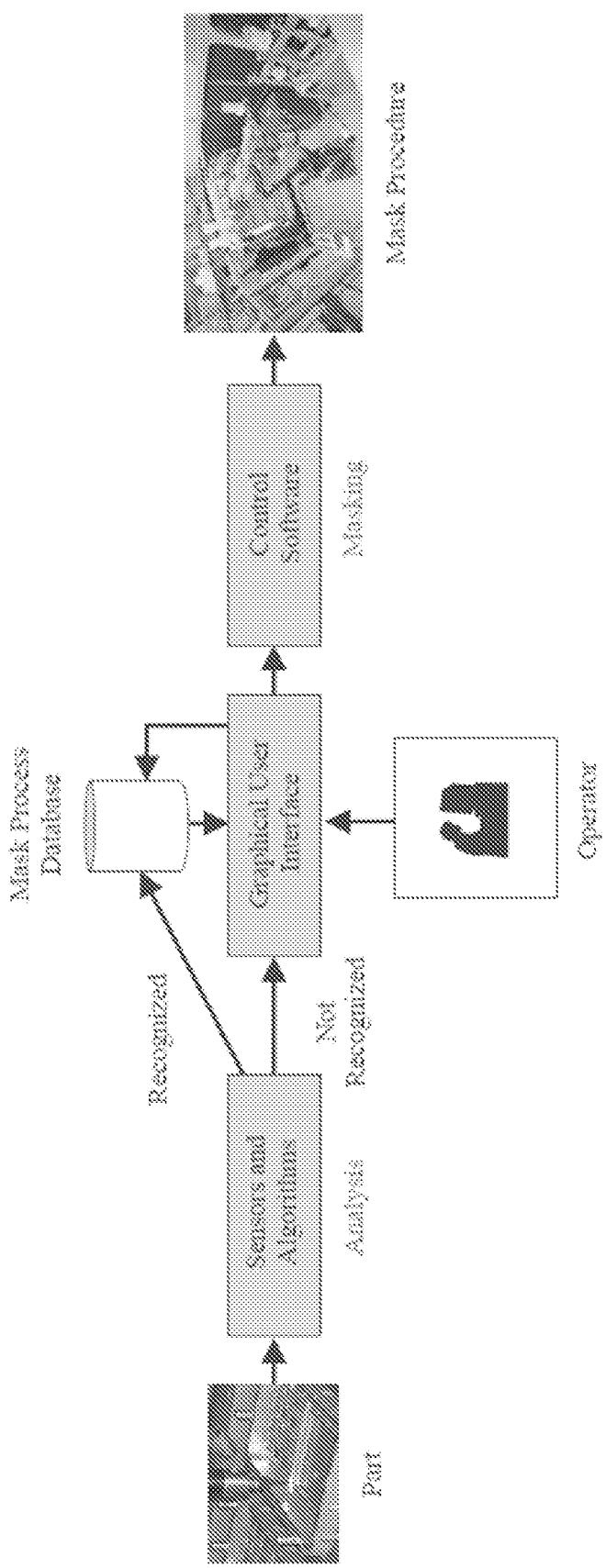
FIG. 25 is a flow chart of one implementation of the robotic coating application process of FIG. 1.

The software components utilized in various embodiments of the robotic coating application system in are shown in FIG. 25 and may include 1) part shape analysis, 2) masking process database, 3) masking process generation and storage, 4) graphical user interface, and 5) control software. For example, the part shape analysis may use 3D machine vision tools already developed such those developed by Energid Technologies. The masking process generation may include graphical configuration and simulation software for testing from robotic control toolkits such as those available from Energid Technologies. These processes may be stored in the database using existing XML, integration. The graphical user interface may use 3D rendering and graphical tools and leverage the database of masking processes. The control software may use the robotic control toolkit's robot-agnostic control to interface sensors and path planning with robot hardware that can be interchanged. The database of procedures may use various tools for creating configurable object-oriented databases. The overall software architecture of the masking system may be based on Energid Technologies' Actin robotic control toolkit. The robotic control toolkit allows a user to control, design, and validate complex robotic mechanisms. For example, the robotic control toolkit calculates joint positions and rates that set robotic end effectors where a user wants them. It provides tools for geometric reasoning. It supports cooperation of multiple robotic manipulators. And it provides ways to capture and reason with camera imagery. It supports three-dimensional rendering and can be used for network TCP/IP communications that provide control.

The robotic control toolkit or control application (e.g., robotic control application) may enable designers with initial ideas to bring them to practical reality as quickly as possible. The robotic control toolkit provides a library of actuators and other robotic components that can be used to quickly construct models for testing using the toolkit's control systems. It includes a plugin to other design tools, such as SolidWorks, that enable fast testing integrated with designers' favorite tools. The robotic control toolkit supports quick kinematic and dynamic tests to be combined with automated control system construction.

The robotic control toolkit may assess the performance of complete robot designs for application to particular tasks. It can be used to kinematically and dynamically simulate physical environments. It also supports Monte Carlo simulation and Parameter Optimization analysis. Included are high fidelity articulated dynamics and impact dynamics.

This section gives an overview of the capabilities in all of these packages. Each package of a robotic control toolkit may include a set of libraries and header files that can be used with your C++ project to easily add manipulator-control and simulation capability. These toolkit components can be integrated into existing code or used to build a new program. Both Linux and Windows are supported.

Extensible Markup Language (XML). Components are configurable using XML, and you can easily connect your code with components from the robotic control toolkit to build XML-configurable C++ objects. In addition to reading and writing themselves in XML, all XML-configurable objects can write their own validating schemas. So if a user uses the robotic control toolkit to build a system, the system may be designed in an XML language that can be used with other commercial software products.

Mathematical and Geometrical Tools. The robotic control toolkit includes a number of tools for easy and efficient mathematical and geometric calculation. These include three-dimensional vector math and matrix routines. Conversion utilities for three-dimensional quantities are included. Orientations can be set from quaternions, Euler angles, Rodrigues parameters, angle-axis, direction cosine matrices, and so forth. These are all optimized for performance. With the robotic control toolkit, a user does not have to re-implement these basic functions.

Automatic Kinematic Control. The robotic control toolkit calculates the joint rates or positions to give desired hand velocities or positions. All is done automatically, based only on the manipulator model description. This is the strength of the robotic control toolkit—the ability to control almost any robotic manipulator using just its kinematic description. Manipulators with any number of links, any number of bifurcations (branches), nonstandard joint types, and non-standard end-effector types are supported.

Dynamic Simulation. The robotic control toolkit may provide dynamic simulation capability. This includes full and accurate Newton-Euler rigid body dynamics on all articulated links and impact dynamics between obstacles. Dynamics are calculated for nontraditional joint types, as well. Both the Composite Rigid Body Inertia (CRBI) algorithm and the Articulated Body Inertia (ARBI) algorithm are implemented. The CRBI algorithm is an Order(n3) method, which is efficient for mechanisms with few—less than 15 or so—degrees of freedom (DOF), while the ARBI algorithm is an Order(n) method, efficient for high-DOF mechanisms.

Parametric Studies. The robotic control toolkit provides capability for parametric and Monte Carlo studies. A parametric takes discrete steps through changes in initial state or system parameters and tabulate simulation results. The design of the parametric study includes 1) representation changes to the initial state and system, and 2) a representation of the results of the simulation runs. A parametric study will allow the user to easily change in fixed increments initial configurations, control parameters, surface properties, weights, lengths, end effectors, motor torques, and actuator effectiveness, and tabulate the results of those changes. Results include measures of sensor saturation, visibility, speed, mobility, balance, end effector placement, and manipulation.

Monte Carlo Studies. A Monte Carlo study is performed by selecting random initial values for the system and state parameters. In addition, noise is input to sensor and actuator models. The noise models for the sensors and actuators is built into the classes that define them. The initial conditions for the system state are selected based on a set of probability density functions, as are the selected values for a time sequence of desired end-effector positions. In the robotic control toolkit, Monte Carlo studies can be used to perform parameter-optimization analysis to determine the best design values.

Rendering. The robotic control toolkit provides cross-platform rendering and visualization capability. Any manipulator can be viewed through an easy-to-use interface that pops up a window with an animation. Any number of manipulators can be shown in the visualization. The specular properties of polygons can be set, polygons can be bit mapped, and any number of lights can be configured. These tools provide capability for intuitive debugging and for creating human-machine interfaces for remote supervision and teleoperation.

Machine Vision. The robotic control toolkit includes methods for capturing images with a camera (e.g., a USB camera), firewire camera, and/or frame grabber. It also includes algorithms for analyzing captured images and using the results as information to feed back to the controller. The toolkit includes camera calibration algorithms that allow for the automatic calculation of camera parameters, such as focal length and position/orientation. These tools provide capability for making vision-based robotic control systems.

Network Communications. The toolkit includes C++ classes for network communications. Sockets are implemented both for TCP/IP and UDP/IP communications. A networking stream class is implemented to allow the transmission of XML data from one network location to another. This allows front-end and backend components to be implemented on different computers for remote supervision and teleoperation.

Third-Party Integration. The robotic control toolkit supports integration with a variety of third-party software. It includes plug-in support for SolidWorks™, integration with Matlab™ Simulink, integration with Skype™, and the ability to load formats from 3D Studio Max and VRML.

Manipulator tasking for the system will be handled by the robotic control toolkit's control director software. An example of this may include Actin's Manipulation Director created by Energid Technologies. The manipulation director has been deployed with great success across different industries, including medical robotics and industrial manipulators used for fabrication. This tool allows users to define a sequence of "directions" (actions) to be executed by a set of "actors" (robots). This system allows graphical programming of actions. Users can define actions to be dependent on other actions, and also allows condition execution and branching of tasks. The result is a simple to use tool that allows for powerful, complex scripting of tasks. Current status, and success or failure of a task is reported back by the manipulation director.

In some implementations, the graphical user interface may include an "Execute Scan" direction will instruct the system to perform a full 360° scan of the part. This will include evaluating whether motion of the vertical line scanner axis is necessary (as for tall parts mounted vertically), and assembling the scan data into a single point cloud. A second new direction, the "Estimate Pose" direction may then proceed to estimate the pose of the part based on the measured point cloud and pre-existing models of the part. This may allow precise positioning of the part within the model maintained by the control system. Additionally, several simple directions may control the flow of maskant, the UV curing system, and the air filtration system. Each direction may have a configuration GUI associated with it to allow intuitive user control.

Input/Output Control. As mentioned above, both digital and analog I/O may be handled by the control computer (provided as part of the UR system package (e.g., UR Controller 210)). In the event that the capabilities of this machine are not sufficient (in either number or performance), a dedicated I/O card may be installed in the interface computer system. Cards may be provided which have fast performance and easy installation, while also offering a large number of both analog and digital I/O channels. Most are also able to interface with encoders, allowing precision position feedback.

Figure 26:
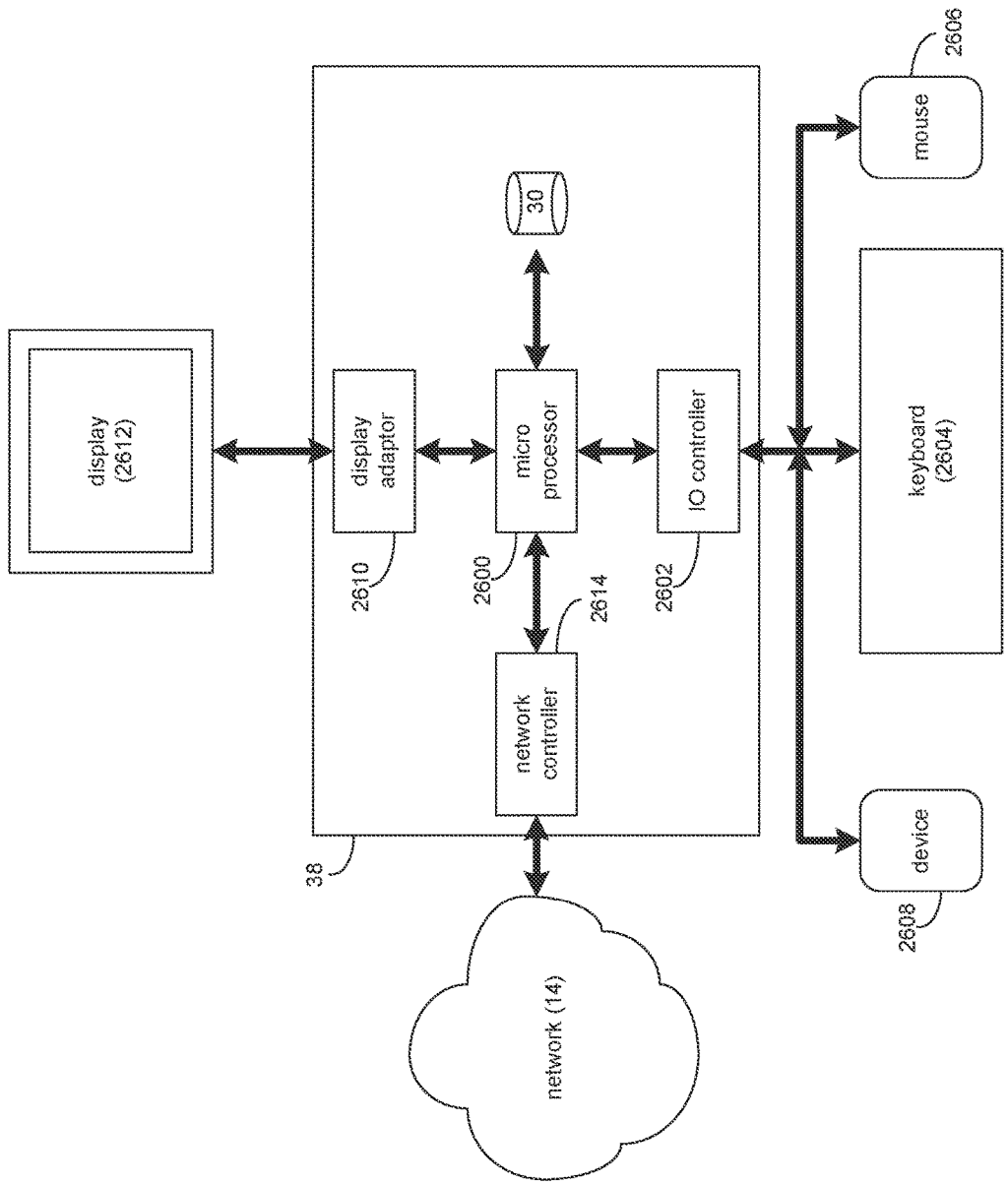
FIG. 26 is an example diagrammatic view of a client electronic device of FIG. 1 according to one or more example implementations of the disclosure.

Referring also to FIG. 26, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, robotic coating application process 10 may be substituted for client electronic device 38 within FIG. 26, examples of which may include but are not limited to computing device 12 and/or client electronic devices 40, 42, 44.

Client electronic device 38 may include a processor and/or microprocessor (e.g., microprocessor 2600) configured to, e.g., process data and execute the above-noted code/instruction sets and subroutines. Microprocessor 2600 may be coupled via a storage adaptor (not shown) to the above-noted storage device(s) (e.g., storage device 30). An I/O controller (e.g., I/O controller 2602) may be configured to couple microprocessor 2600 with various devices, such as keyboard 2604, pointing/selecting device (e.g., mouse 2606), custom device, such a microphone (e.g., device 2608), USB ports (not shown), and printer ports (not shown). A display adaptor (e.g., display adaptor 2610) may be configured to couple display 2612 (e.g., CRT or LCD monitor(s)) with microprocessor 2600, while network controller/adaptor 2614 (e.g., an Ethernet adaptor) may be configured to couple microprocessor 2600 to the above-noted network 14 (e.g., the Internet or a local area network).

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A robotic coating application system, comprising:
   at least one robot configured to apply a coating to at least one part located within an enclosure;
   a scanner configured to scan the at least one part, wherein the scanner is movable along the enclosure and affixed to the enclosure;
   a turntable configured to hold the at least one part;
   at least one processor configured to generate a model of the at least one part;
   a graphical user interface, located outside of the enclosure, to display the model of the at least one part and allow a user to select a portion or subportion of the model for application of the coating; and
   automatically applying the coating to the at least one part based upon, at least in part, the user-selected portion or subportion.

2. The robotic coating application system of claim 1, wherein the at least one robot includes a robotic arm.

3. The robotic coating application system of claim 2, wherein the robotic arm includes an end effector configured to perform scanning or applying of the coating.

4. The robotic coating application system of claim 1, further comprising:
   a computing device configured to retrieve the model of the at least one part.

5. The robotic coating application system of claim 1, wherein the coating is selected from the group consisting of maskant, adhesive, and paint.

6. The robotic coating application system of claim 1, wherein the graphical user interface is configured to allow for user selection using a handheld device or touchscreen.

7. The robotic coating application system of claim 1, further comprising:
   using the at least one robot, while in a training mode, to select a portion or subportion of the model for application of the coating.

8. The robotic coating application system of claim 1, wherein the at least one robot is configured operate at least partially within the enclosure.

9. The robotic coating application system of claim 1, wherein the enclosure includes ultraviolet light curing capabilities.

* * * * *